(12) United States Patent
Ohsugi et al.

(10) Patent No.: US 10,088,620 B2
(45) Date of Patent: Oct. 2, 2018

(54) LIGHT GUIDE, VIRTUAL IMAGE OPTICAL SYSTEM, AND VIRTUAL IMAGE DISPLAY DEVICE

(71) Applicants: Shiori Ohsugi, Kanagawa (JP);
Takashi Kubota, Tokyo (JP);
Takanobu Osaka, Kanagawa (JP);
Naoki Nakamura, Saitama (JP)

(72) Inventors: Shiori Ohsugi, Kanagawa (JP);
Takashi Kubota, Tokyo (JP);
Takanobu Osaka, Kanagawa (JP);
Naoki Nakamura, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 13 days.

(21) Appl. No.: 15/270,678

(22) Filed: Sep. 20, 2016

(65) Prior Publication Data
US 2017/0090094 A1  Mar. 30, 2017

(30) Foreign Application Priority Data

Sep. 29, 2015 (JP) .................................. 2015-190824
Sep. 29, 2015 (JP) .................................. 2015-190825
Sep. 29, 2015 (JP) .................................. 2015-190826

(51) Int. Cl.
*G02B 27/14* (2006.01)
*F21V 8/00* (2006.01)
*G02B 27/01* (2006.01)

(52) U.S. Cl.
CPC ........... *G02B 6/0035* (2013.01); *G02B 6/003* (2013.01); *G02B 6/0058* (2013.01); *G02B 27/0172* (2013.01); *G02B 2027/0125* (2013.01)

(58) Field of Classification Search
CPC .... G02B 6/0035; G02B 6/003; G02B 6/0058; G02B 27/0172; G02B 2027/0125
See application file for complete search history.

(56) References Cited

U.S. PATENT DOCUMENTS

| | | | | |
|---|---|---|---|---|
| 2012/0057253 | A1* | 3/2012 | Takagi | G02B 27/0172 359/861 |
| 2013/0083403 | A1* | 4/2013 | Takagi | G02B 27/0172 359/618 |
| 2013/0088415 | A1* | 4/2013 | Totani | G02B 27/0172 345/8 |

FOREIGN PATENT DOCUMENTS

| | | |
|---|---|---|
| JP | 2012-198260 | 10/2012 |
| JP | 2014-068365 | 4/2014 |
| JP | 2014-153644 | 8/2014 |

(Continued)

*Primary Examiner* — Alicia M Harrington
(74) *Attorney, Agent, or Firm* — Oblon, McClelland, Maier & Neustadt, L.L.P.

(57) ABSTRACT

A light guide for a virtual image device to guide and emit image light output from an image display element to display a virtual image. The light guide includes a light-guide member and an optical member. The light-guide member includes an incidence portion to receive the image light and an exit portion to emit the image light to an outside, and a reflective portion inclined relative to the incidence portion to guide the image light received by the incidence portion into the light guide. The light-guide member also includes an extraction portion including first planes each inclined relative to the exit portion and second planes each parallel with the exit portion, to guide the image light from each first plane to the exit portion and extract the image light. The optical member includes a parallel plane and an inclined portion.

19 Claims, 20 Drawing Sheets

(56) References Cited

FOREIGN PATENT DOCUMENTS

WO    WO 2003/081320 A1    10/2003
WO    WO 2009/074638 A2    6/2009

\* cited by examiner

LIGHT GUIDE, VIRTUAL IMAGE OPTICAL SYSTEM, AND VIRTUAL IMAGE DISPLAY DEVICE

CROSS-REFERENCE TO RELATED APPLICATIONS

This patent application is based on and claims priority pursuant to 35 U.S.C. § 119(a) to Japanese Patent Application No. 2015-190825, filed on Sep. 29, 2015, Japanese Patent Application No. 2015-190824, filed on Sep. 29, 2015, and Japanese Patent Application No. 2015-190826, filed on Sep. 29, 2015, in the Japan Patent Office, the entire disclosures of which are hereby incorporated by reference herein.

BACKGROUND

Technical Field

Exemplary aspects of the present disclosure generally relate to a light guide, a virtual image optical system including the light guide, and a virtual image display device including the light guide.

Related Art

There has been known a virtual image display device including a light guide to enlarge a two-dimensional image with a virtual image optical system VO and display the enlarged image to an observer. As an example of the light guide for use in the virtual image display device, a head mounted display (HMD) is widely used. The HMD is categorized into a transmissive and a non-transmissive display. The examples of a transmissive HMD include Google Glass (registered trademark) manufactured by Google Ltd.

A desired transmissive HMD is compact and portable to be used in combination with an information terminal or used to provide Augmented Reality (AR). A desired non-transmissive HMD, which is used for watching movies, playing games, or providing Virtual Reality (VR), has a wide viewing angle to provide a sense of immersion to users.

In recent years, there is a demand for such a transmissive HMD to be thin and compact with a wide viewing angle.

SUMMARY

In an aspect of this disclosure there is provided a light guide including a light-guide member and an optical member. The light-guide member includes an incidence portion through which image light output from an image display element enters the light-guide member and an exit portion to emit the image light having entered the light-guide member through the incidence portion to an outside of the light-guide member, and a reflective portion inclined relative to the incidence portion to guide the image light received by the incidence portion into the light guide. The light-guide member also includes an extraction portion including at least one first plane inclined relative to the exit portion and at least one second plane parallel with the exit portion, to guide the image light from the at least one first plane to the exit portion and extract the image light. The first plane and the second plane alternate in the extraction portion. The optical member is integrated with the light-guide member. The optical member includes a parallel plane parallel with the exit portion and an inclined portion inclined relative to the parallel plane.

In another aspect of this disclosure there is provided a virtual image optical system including an image display element to output image light of a display image, a collimator optical system to emit the image light output from the image display element, and the light guide described above.

The optical axis of the collimator optical system is inclined relative to the exit portion of the light guide.

In still another aspect of this disclosure there is provided a virtual image display device that includes a light source to emit light, an image display element, a collimator optical system, and the light guide described above to guide and emit the image light emitted from the collimator optical system. The image display element receives the light emitted from the light source and outputs image light of a display image to be displayed as a virtual image. The collimator optical system emits the image light output from the image display element.

BRIEF DESCRIPTION OF THE DRAWINGS

The aforementioned and other aspects, features, and advantages of the present disclosure will be better understood by reference to the following detailed description when considered in connection with the accompanying drawings, wherein.

Figure 1:
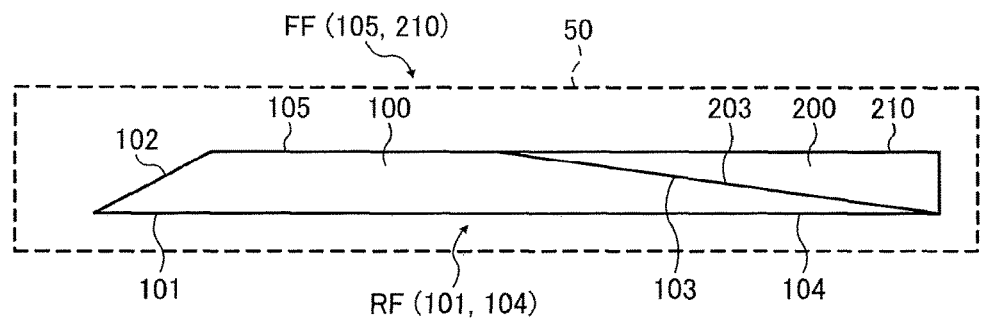
FIG. 1 is a plan view of a light guide according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

A description is provided of embodiments according to the present disclosure, referring to the drawings. The following embodiments of the present disclosure relate to a transmissive light guide and a virtual image display device including the light guide.

Figure 2:
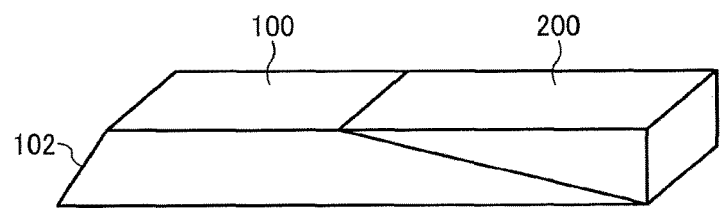
FIG. 2 is a perspective view of the light guide of FIG. 1.
Figure 3:
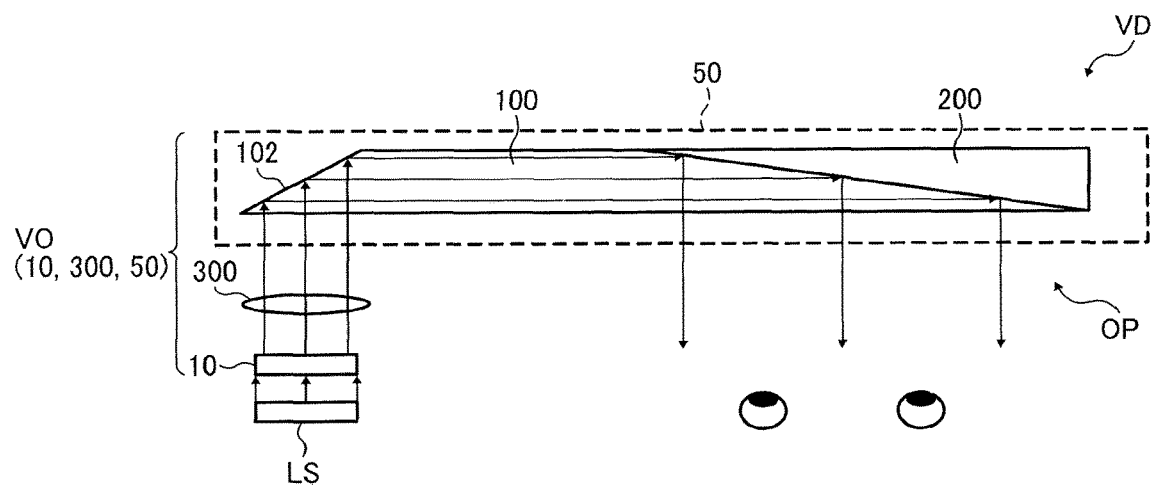
FIG. 3 is a plan view of a virtual image display device with the light guide according to an embodiment of the present disclosure.

FIGS. 1 and 2 illustrate a light guide 50 according to the present embodiment. FIG. 3 illustrates a virtual display device VD including a virtual image optical system VO with an optical path OP. As illustrated in FIG. 3, the optical path OP of the virtual image optical system VO is indicated by arrow. FIG. 3 also illustrates eyes of a user as an observer of a virtual image. Hereinafter, a rear face RF of the light guide 50 refers to a face close to the observer (the bottom surface of the light guide 50 in FIG. 3) and a front face FF of the light guide 50 refers to a face away from the observer (the upper surface of the light guide 50 in FIG. 3).

A description is provided of the light guide 50, referring to FIGS. 1 and 2. The light guide 50 is an element to allow image light output from an image display element 10 to enter the light guide 50. The light guide 50 further guides the image light into the light guide 50 and emits the image light to display a virtual image. The light guide 50 according to the present embodiment includes a light-guide member 100 and an optical member 200 which are integrated with the light-guide member 100 to form a substantially prismatic shape as a whole, representing an asymmetric trapezoidal shape in a plan view.

According to the present embodiment, the light-guide member 100 of the light guide captures and guides the image light coming from the image display element 10, outputting the image light to the outside of the light guide 50 to display a virtual image. The light-guide member 100 includes an incidence portion 101, a reflective portion 102, an extraction portion 103, an exit portion 104, and a first front face 105. The incidence portion 101 allows the image light to enter the incidence portion 101. The reflective portion 102 reflects and guides the image light having entered the incidence portion 101 into the light-guide member 100. The extraction portion 103 extracts the guided image light and the exit portion 104 emits the image light to the outside of the light guide 50.

In the light-guide member 100 according to the present embodiment, each of a first front face 105 and the rear face RF has a planar surface. The first front face 105 is parallel with the rear face RF.

The incidence portion 101 and the exit portion 104 are disposed on the rear face RF of the light-guide member 100. That is, the incidence portion 101 and the exit portion 104 are disposed on the identical plane. Such a configuration increases the productivity of the light-guide member 100 and the light guide 50, allowing a simple structure of the light-guide member 100 and the light guide 50 as a whole.

A description is given of the light-guide member 100 according to another embodiment of this disclosure. The light-guide member 100 of the light guide 50 according to another embodiment includes the incidence portion 101 to receive the image light coming from the collimator optical system 300 and the exit portion 104 to output the image light to the outside of the light guide 50. In the light-guide member 100 according to another embodiment, the incidence portion 101 and the exit portion 104 are formed by planes different from each other. The "planes different from each other" refer to one plane and another plane inclined relative to the one plane, referring neither to the identical plane nor to planes parallel with each other. According to the present embodiments of this disclosure, the incidence portion 101 is inclined relative to the exit portion 104 at an obtuse angle.

In the light-guide member 100 according to the present embodiment of this disclosure, the incidence portion 101 and the exit portion 104 each is a planar surface. With each of the incidence portion 101 and the exit portion 104 configured to be a planar surface, the productivity of the light-guide member 100 and the light guide 50 increases and the light-guide member 100 and the light guide 50 as a whole are provided in a simple structure.

Further, with the incidence portion 101 and the exit portion 104 formed by different planes, an appropriate angle of the incident light rays is set, thereby allowing a compact light guide 50, that is, a small-sized and thin light guide 50. Such a configuration of the incidence portion 101 and the exit portion 104 formed by different planes further allows a larger beam of light to enter the light guide 50 than other configurations in which the incidence portion 101 and the exit portion 104 are not formed by different planes do. This advantageously increases a viewing angle.

It is to be noted that when the incidence portion 101 and the exit portion 104 are formed on the identical plane, the degree of freedom for designing the incidence portion 101 and the exit portion 104 decreases although fabricating and controlling the incidence portion 101 and the exit portion 104 are facilitated. Accordingly, increasing a viewing angle unsuccessfully increases the light guide 50 in size and thickness. Thus, in the light-guide member 100 according to the present embodiment, the incidence portion 101 and the exit portion 104 are formed by different planes.

To obtain successful see-through characteristics of the light guide 50, the rear face RF, on which the exit portion 104 is disposed, is formed to be parallel with the first front face 105 of the front face FF (the upper surface of the light guide 50 in FIG. 1) in the light-guide member 100 according to the embodiment of the present disclosure.

Figure 18:
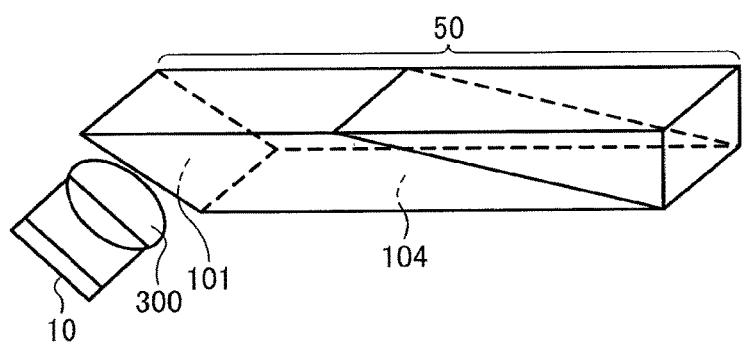
FIG. 18 is a perspective view of the virtual image optical system of FIG. 17.
Figure 20:
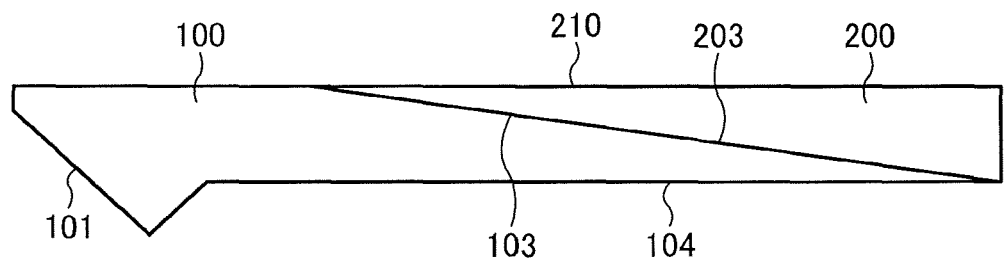
FIG. 20 is a plan view of a light guide according to another embodiment.
Figure 21:
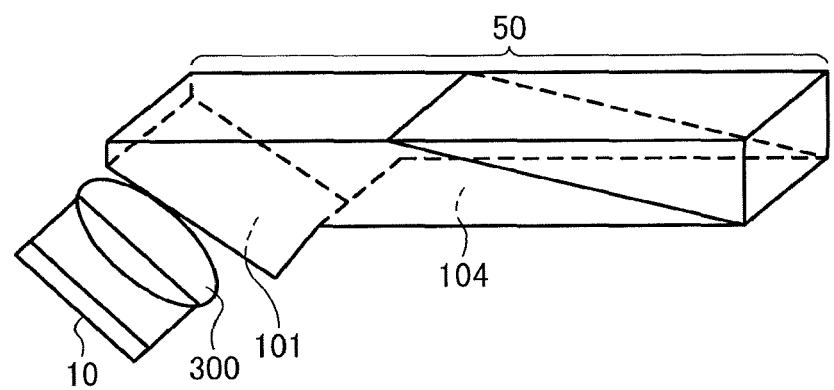
FIG. 21 is a perspective view of a virtual image optical system including the light guide of FIG. 20.

In the light-guide member 100 according to the embodiment illustrated in FIG. 1, the rear face RF as a whole including the exit portion 104 is formed to be a planar surface. By contrast, as illustrated in FIG. 20, the incidence portion 101 of the light-guide member 100 may have a shape in which a triangle area projects beyond a plane extending from the exit portion 104 in a plan view. FIG. 21 is a perspective view of a virtual image optical system VO including the light guide 50 illustrated in FIG. 20. In light-guide member 100 according to the embodiment illustrated in FIG. 20, the area of the incidence portion 101 is relatively larger than the area of the incidence portion 101 of the light-guide member 100 of FIG. 18. Thus, a larger light beam enters the light guide 50, resulting in a wider viewing angle being ensured in the light-guide member 100 according to the embodiment illustrated in FIG. 20. Further, the light guide 50 of FIG. 20 allows the incidence of image light having a wider angle by changing the incident angles of light rays coming from the collimator optical system 300.

The light-guide member 100 according to the embodiments of the present disclosure includes the extraction portion 103 to guide the image light having entered through the incidence portion 101 to the exit portion 104, extracting an image from the image light. A detailed description is given later of the extraction portion 103. Preferably, the light-guide member 100 of the light guide 50 is made of high light-transmissive material to ensure the see-through characteristics of the light guide 50. More preferably, the light-guide member 100 is made of resin to subject the extraction portion 103 to machining.

Figure 22A:
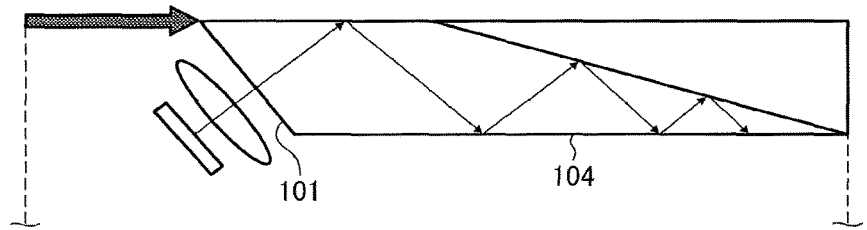
FIG. 22A is a plan view of the light guide of FIG. 1.
Figure 22B:
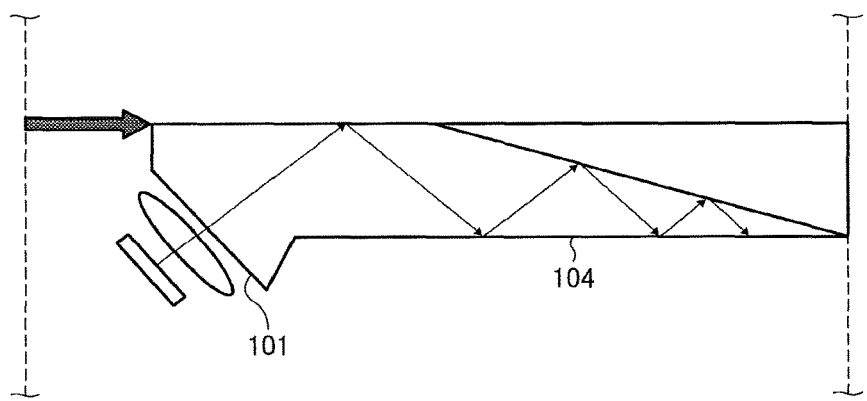
FIG. 22B is a plan view of the light guide of FIG. 20.
Figure 22C:
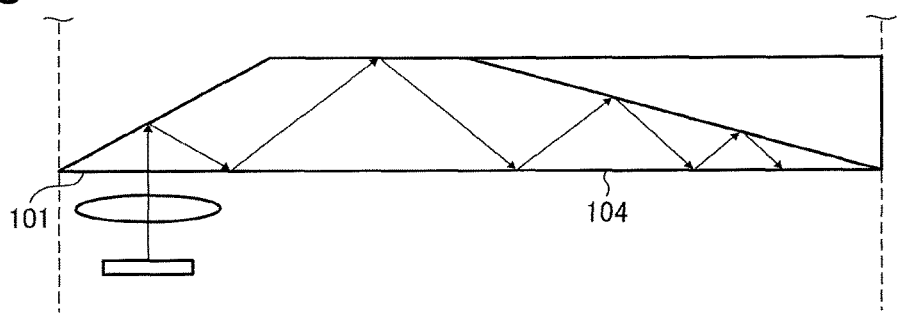
FIG. 22C is a light guide as a comparative example.

FIGS. 22A, 22B, and 22C respectively illustrate the light guide 50 of FIG. 1, the light guide 50 of FIG. 20, and the light guide 50 as a comparative example in which the incidence portion 101 and the exit portion 104 are formed on the identical plane. As illustrated in FIGS. 22A, 22B, and 22C, the light rays output from the collimator optical system 300 to enter the light guide 50 through the incidence portion 101 travel obliquely upward and downward in an alternate manner while being totally reflected by the planes of the light-guide member 100 within the light guide 50, traveling to the exit portion 104. The light guide 50 of FIGS. 22A and 22B, in which the incidence portion 101 and the exit portion 104 are formed by different planes, has a shorter length in the longitudinal direction, thereby reducing the reflection of light than the light guide 50 of FIG. 22C in which the incidence portion 101 and the exit portion 104 are formed on the identical plane. Thus, forming the incidence portion 101 and the exit portion 104 by different planes reduces the light guide 50 in size.

According to the present embodiment, the extraction portion 103 of the light-guide member 100 reflects the guided image light toward the exit portion 104. The exit portion 104 emits the image light reflected from the extraction portion 103 toward the eyes of the observer of a virtual image.

The optical member 200 according to the present embodiment has a tapered shape in a plan view and is opposed to the extraction portion 103 of the light-guide member 100. Such a configuration ensures light transmissivity, i.e., see-through characteristics of the extraction portion 103 and the exit portion 104.

The optical member 200 according to the present embodiment includes a second front face 210 as a parallel plane and an inclined portion 203. The second front face 210 is parallel with the exit portion 104 of the light-guide member 100. The inclined portion 203 is inclined relative to the second front face 210, facing the extraction portion 103 of the light-guide member 100. The inclined portion 203 of the optical member 200 is adjacent to the extraction portion 103 of the light-guide member 100. The detailed description is provided later of the inclined portion 203.

In the light guide 50 according to the present embodiment of this disclosure, the first front face 105 of the light-guide member 100 and the second front face 210 of the optical member 200 are disposed to form the identical plane. Thus, the light guide 50 as a whole has a shape in which the front face FF is kept in parallel with the rear face RF. As a variation of the light guide 50, the second front face 210 of the optical member 200 is forward or backward from the position of the first front face 105 of the light-guide member 100 in some embodiments. That is, in some embodiments, the position of the first front face 105 of the light-guide member 100 coincides with the position of the second front face 210 of the optical member 200 to ensure the see-through characteristics of the light guide 50. Alternatively, in some embodiments, the positions of the first front face 105 and the second front face 210 may shift with each other for portable use and other intended uses. In any cases, however, the extraction portion 103 of the light-guide member 100 is not exposed to the outside.

In the light guide 50 according to the present embodiment, the exit portion 104 of the light-guide member 100 has a planar surface parallel with the second front face 210 of the optical member 200. Such a configuration improves the see-through characteristics of the light guide 50 through the exit portion 104. When the planar surface of the exit portion 104 of the light-guide member 100 is not parallel with the second front face 210 of the optical member 200, the see-through characteristics of the light guide 50 deteriorates due to the prism effect.

Figure 31:
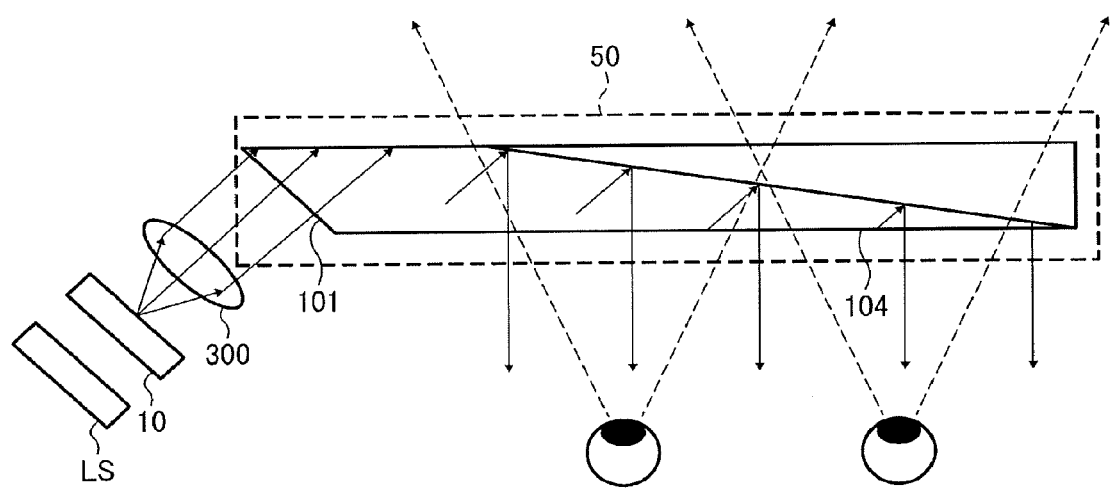
FIG. 31 is a plan view of a virtual image display device including a virtual image optical system according to an embodiment of the present disclosure.

The following describes the virtual display device VD including the light guide 50 according to the present embodiment, referring to FIG. 3. The virtual display device VD according to the present embodiment includes the image display element 10, a collimator optical system 300, and the light guide 50. The image display element 10 outputs image light of a display image to the collimator optical system 300. The collimator optical system 300 collimates the image light and the collimated image light enters the light guide 50. The image display element 10, the collimator optical system 300, and the light guide 50 constitute the virtual image optical system VO. FIG. 31 is a schematic illustration of a virtual image display device VD including the light guide 50 and the virtual image optical system VO. In FIG. 31 the optical paths OP of the image light are indicated by arrows. FIG. 31 also schematically illustrates eyes of a user as an observer of a virtual image. The virtual image display device VD of FIG. 31 according to another embodiment of the present disclosure includes the virtual image optical system VO of FIG. 2 and a light source LS as an additional component to illuminate the image display element 10. A description is omitted of the same parts as those of the virtual image display device VD in FIG. 2. The image display element 10 of FIG. 31 is the LCOS or the DMD in which a light source is employed together. Examples of the light source LS include a light emitting diode (LED), a semiconductor laser (laser diode (LD)), and a discharge lamp.

The image display element 10 outputs image light corresponding to a display image, the image light which passes through the light guide 50 to be displayed as a virtual image. Examples of the image display element 10 include, but not limited to, an organic light emitting diode (OLED) and a liquid crystal display element. Alternatively, other various display types are also applicable. For example, a digital micro-mirror device (DMD) is applicable as the image display element 10. Alternatively, in some embodiments, a thin film transistor (TFT) or a liquid crystal on silicon (LCOS) is applicable as the image display element 10. Alternatively, in some embodiments, a micro electro mechanical system (MEMS) is applicable as the image display element 10.

The image display element 10 of FIG. 3 according to the present embodiment is the LCOS or the DMD, in which a light source is employed together. In FIG. 3, a light source LS is employed to illuminate the image display element 10. Examples of the light source LS include a light emitting diode (LED), a semiconductor laser (laser diode (LD)), and a discharge lamp.

According to the present embodiment, the collimator optical system 300, which includes a plurality of optical lenses and a stop aperture, enlarges the image light output from the image display element 10 and outputs the enlarged parallel light to the light guide 50.

Figure 19:
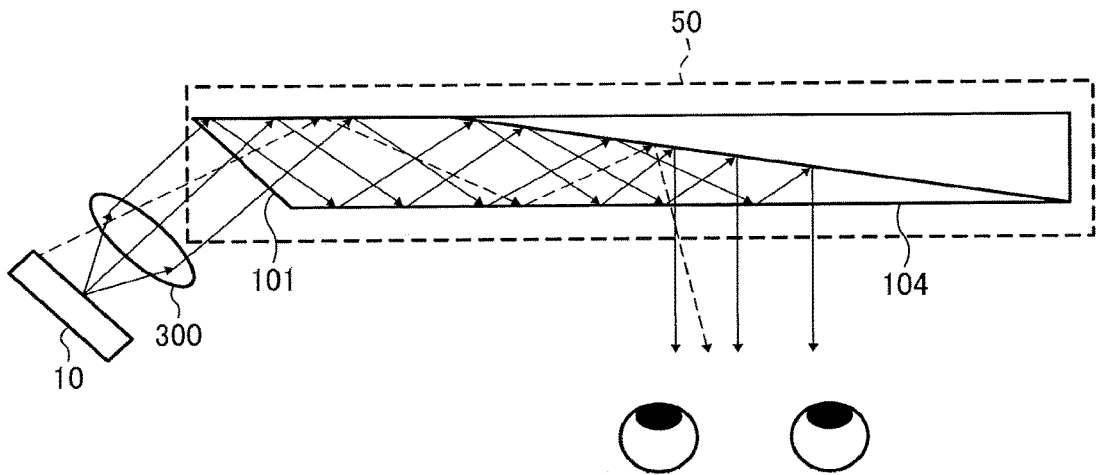
FIG. 19 is an illustration of optical paths of the virtual image optical system of FIG. 17.

The collimator optical system 300 according to the present embodiment of this disclosure enlarges the image light output from the image display element 10, outputting the enlarged image light as parallel light. As illustrated in FIG. 19, the central axis (optical axis) of light output from the collimator optical system 300 according to the present embodiment is inclined relative to the exit portion 104 of the light guide 50. The configuration of the collimator optical system 300 is described later.

In the virtual display device VD according to the present embodiment, the collimator optical system 300 enlarges and collimates the image light output from the image display element 10 illuminated with the light source LS. The output image light enters the light guide 50. Specifically, the image light enlarged by the collimator optical system 300 enters the light guide 50 via the incidence portion 101 of the light-guide member 100 and is reflected by the reflective portion 102. The reflected image light passes through the light-guide member 100. The guided image light is reflected by the extraction portion 103 and the reflected image light is output from the exit portion 104 toward the eyes of a user (observer), as image data. The user (observer) looks forward through the exit portion 104 of the light-guide member 100 and the optical member 200 to visually identify a virtual image of the image light.

Figure 23A:
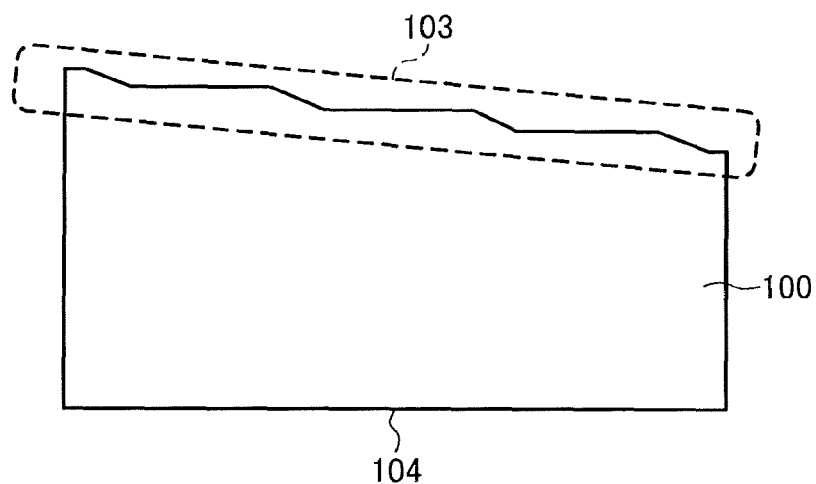
FIG. 23A is a plan view of a part of an extraction portion a light-guide member of a light guide according to another embodiment of the present disclosure.
Figure 23B:
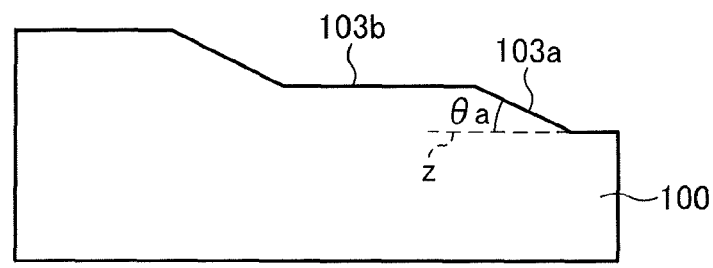
FIG. 23B is an enlarged view of the part of the extraction portion of the light guide member of the light guide of FIG. 23A.

Next, a detailed description is provided of the light guide 50 according to the present embodiment of this disclosure, referring to FIG. 4 through FIG. 11. A description is also provided of a configuration of the extraction portion 103 of the light-guide member 100 according to another embodiment of the present disclosure, referring to FIGS. 23A and 23B. FIG. 23A is a schematic view of a portion of the extraction portion 103 and the exit portion 104 of the light-guide member 100. FIG. 23B is an enlarged view of a part of the extraction portion 103 of the light-guide member 100 according to another embodiment of the present disclosure. FIG. 23B represents a virtual plane parallel with the exit portion 104 indicated by dotted line z.

Preferably, the light-guide member 100 of the light guide 50 is made of high light-transmissive material to ensure the see-through characteristics. More preferably, the light-guide member 100 is made of resin so that the extraction portion 103 is subjected to machining.

According to the present embodiment, the incidence portion 101 and the reflective portion 102 of the light-guide member 100 receives and reflects the image light as light rays enlarged by the collimator optical system 300, respectively. Each of the incidence portion 101 and the reflective portion 102 is larger than the size of the light rays.

Figure 4:
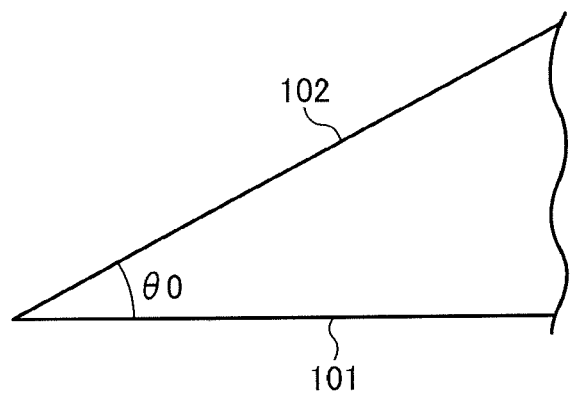
FIG. 4 is an enlarged view of an incidence portion and a reflective portion of a light-guide member in the light guide according to an embodiment of the present disclosure.
Figure 5:
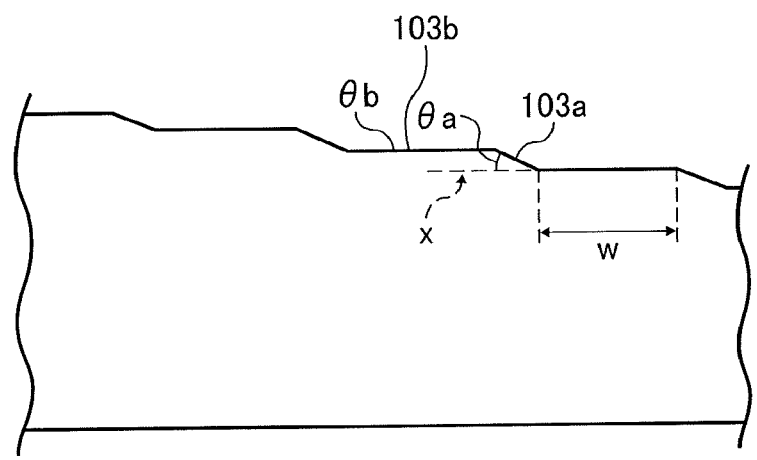
FIG. 5 is an enlarged view of an extraction portion of the light-guide member in the light guide according to an embodiment of the present disclosure.

As illustrated in FIG. 4, both the reflective portion 102 and the incidence portion 101 have a planar surface. The reflective portion 102 is inclined at an angle of $\theta_0$ degrees relative to the incidence portion 101 to reflect and guide the image light having entered the incidence portion 101 into the light guide 50. With such an angle of $\theta_0$ degrees formed by the reflective portion 102 and the incidence portion 101, the reflective portion 102 totally reflects the image light having entered the incidence portion 101. Preferably, the angle $\theta_0$ ranges from 15 through 75 degrees successfully guides the image light into the light guide 50. As illustrated in FIG. 5, the extraction portion 103 includes a plurality of first planes 103a and a plurality of second planes 103b. Each of the first planes 103a and the exit portion 104 form an angle of $\theta_a$ degrees. To obtain a suitable range of the angle $\theta_a$, the angle $\theta_0$ preferably ranges from 20 through 35 degrees, and more preferably from 20 through 30 degrees.

Any coating is applied to the reflective portion 102. Preferably, a mirror coating with a high reflective index, such as aluminum, silver, or dielectric material coating, is applied to the reflective portion 102 to guide the image data into the light guide 50 in some embodiments.

As illustrated in FIG. 5, in the extraction portion 103 according to the present embodiment, each of the first planes 103a (hereinafter, each of the first planes 103a is referred to simply as a "first plane 103a" and the same applies to the second plane 103b) and the exit portion 104 form the angle $\theta_a$ as described above. Each of the second planes 103b and the exit portion 104 form an angle $\theta_b$. The first plane 103a and the second plane 103b alternate to form a stepwise shape. FIG. 5 represents a reference plane parallel with the exit portion 104 indicated by dotted line x and the lateral width w (hereinafter, referred to as "width") of the second plane 103b.

According to the present embodiment, the first plane 103a of the extraction portion 103 guides the light entered and passed through the light-guide member 100 to the exit portion 104 so that the guided image light exit through the exit portion 104. The first plane 103a is a planar surface inclined relative to of the exit portion 104. The first plane 103a is inclined relative to the exit portion 104 in a direction opposite to the direction of inclination of the reflective portion 102 relative to the incidence portion 101. Preferably, the angle $\theta_a$ of inclination of the first plane 103a relative to the exit portion 104 falls within the range of from 20 through 35 degrees, and more preferably from 20 through 30 degrees according to the refractive index of material for the light-guide member 100. Even more preferably, the angle $\theta_a$ is equal to the angle $\theta_0$ of inclination of the reflective portion 102 relative to the incidence portion 101. Such a configuration facilitates adjusting the arrangement of the collimator optical system 300.

According to the present embodiment of this disclosure, the second plane 103b serves as a reflection surface to reflect and guide the image light having entered the light-guide member 100 into the light-guide member 100. The second plane 103b is parallel with the exit portion 104. That is, the angle $\theta b$ is 0 degree. The second plane 103b also serves as a transparent surface to allow light externally coming through the front face FF and the rear face RF of the light guide 50 to pass through the light guide 50 to secure the see-through characteristics.

With the second plane 103b inclined relative to the exit portion 104 to form the angle $\theta b$ which is not 0 degree, the image light passing through the light-guide member 100 and reflected by the second plane 103b does not coincide the image light passing through the light-guide member 100 and reflected by the exit portion 104 due to the difference in reflection angle. In this case, the incidence angle $\theta_{in}$ defined by the light rays having entered the incidence portion 101 and the normal relative to the incidence portion 101 is not equal to the exit angle $\theta_{out}$ defined by the light rays exiting through the exit portion 104 and the normal relative to the exit portion 104. Further, in such a case, the image light passes through the first plane 103a and exits the exit portion 104 to the outside in different directions, generating an unsuccessful virtual image. Thus, the second plane 103b according to the present embodiment of this disclosure is parallel with the exit portion 104, that is, the angle $\theta b$ is 0 degree.

The width w of the second plane 103b of the extraction portion 103 of the light-guide member 100 satisfies the following conditional formula:

$$0.5 \text{ mm} \leq w < 3.0 \text{ mm}.$$

The second plane 103b has a width w in the longitudinal direction of the light-guide member 100, which is a direction along the direction of travel of the image light.

Hereinafter, a description is provided of the conditional formula that defines the width w of the second plane 103b.

The width of field of view that allows a virtual image to be sighted is referred to as "eye box". The distance from the exit portion 104 to the eye balls of a user (observer) to allow the user to sight a virtual image is referred to as "eye relief". The width w of the second plane 103b is defined by the following expression when the symbol "$\varphi$" is the diameter of the eye box, the symbol "L" is the eye relief, the symbol "$t_i$" is the thickness of the light guide 50, and the symbol "n" is the number of the second plane 103b, which is parallel with the exit portion 104, within the extraction portion 103:

$$w = \{2 \tan \theta_b (L + t_1) - t_1 / \tan \theta_a + \varphi\}/(n-1).$$

In this case, with an increase in the width of the eye box, the range of field of view increases. Thus, increasing the diameter $\varphi$ of the eye box is preferable. However, increasing the diameter $\varphi$ of the eye box increases the thickness $t_1$ of the light guide 50, thereby making it difficult to design the light guide 50.

The diameter of an eye is approximately 5 mm in general. The position of the light guide 50 is adjusted as appropriate according to the diameter of the eye, which varies between individuals. The light guide 50 preferably has an eye relief L of greater than or equal to 15 mm to be applied to a virtual image display device in a pair of eyeglasses.

With an eye relief L of 20 mm and an eye box ranging from 5 mm through 10 mm, for example, the width w of the second plane 103b preferably satisfies the following conditional formula:

$$0.5 \text{ mm} \leq w < 3.0 \text{ mm}.$$

With the width w of the second plane 103b below 0.5 mm, the width of the first plane 103a is reduced. However, reducing the width of the first plane 103a easily generates diffraction phenomenon of the incident image light, making it difficult to produce the light guide 50. In such a case, the thickness of the light guide 50 is increased to secure the eye box ranging from 5 mm through 10 mm at a position of an eye relief of 20 mm without reducing the width of the first plane 103a. However, the increase in thickness of the light guide 50 increases the weight of the light guide 50.

By contrast, with the width w of the second plane 103b above 3.0 mm, the density of the light rays of the incident image light reflected by the first plane 103a and exiting through the exit portion 104 decreases, resulting in a reduction in amount of light at the position of the eyes. Thus, it is desirable for the width w of the second plane 103b of the extraction portion 103 to satisfy the following conditional formula:

$$0.5 \text{ mm} < w < 3.0 \text{ mm}.$$

Each second plane 103b may have a different value of width w. Specifically, with a longer distance from the reflective portion 102 to a second plane 103b, the density of light rays of image light decreases. Accordingly, with a longer distance from the reflective portion 102 to a second plane 103b, the width w of the second plane 103b is reduced. With such a configuration, the uneven amount of light is eliminated or reduced because the number of the first planes 103a per unit length increases with a longer distance from the reflective portion 102.

In the same manner as the second plane 103b does, the plurality of first planes 103a of the extraction portion 103 may differ in width from each other to reduce the uneven amount of light. In this case, the width of each first plane 103a refers to the length of the first plane 103a in the longitudinal direction of the light-guide member 100, which is the direction of travel of the incident image light. Specifically, with a longer distance from the reflective portion 102 to each first plane 103a, the width of the first plane 103a increases. Such a configuration increases the area of a first plane 103a with distance from the reflective portion 102, thus eliminating or reducing the uneven amount of light.

Preferably, the thickness of the light guide 50 ranges from 1 mm through 8 mm. With the thickness of the light guide 50 below 1 mm, forming the shape of the extraction portion 103 of the light-guide member 100 is difficult. With the thickness of the light guide 50 above 8 mm, the structural components increase in weight although a wide viewing angle is obtained.

Any coating is applied to the first plane 103a and the second plane 103b of the extraction portion 103 in some embodiments. In some embodiments, a half-mirror coating is applied to the extraction portion 103 to ensure a certain level of transmissivity and obtain the see-through characteristics of the light guide 50.

Figure 12:
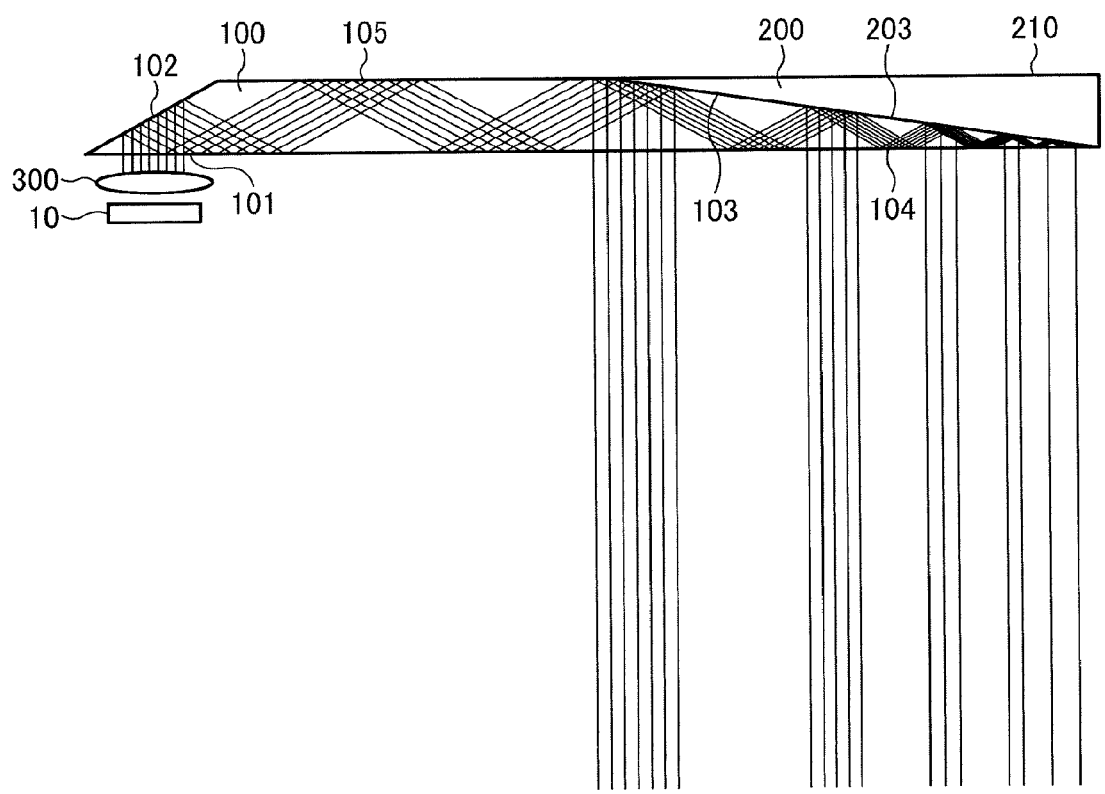
FIG. 12 is an illustration of uneven light rays of image light emitted from the light guide.

As illustrated in FIG. 12, more uneven light rays of the image light are emitted from the exit portion 104 with a longer distance from the reflective portion 102, i.e., at a position more toward the right side in FIG. 12. Such a phenomenon means that the brightness of the image light changes with the observation position that is the position of the observer's eyes relative to the exit portion 104. This causes an uneven brightness.

To prevent uneven brightness, the extraction portion 103 has the following configurations in some embodiments.

The extraction portion 103 according to an embodiment of the present disclosure, a first plane 103a of the extraction portion 103 has a wider width with a longer distance from the reflective portion 102 to the first plane 103a. In this case, the width of the first plane 103a refers to the length of the first plane 103a in the longitudinal direction of the light-guide member 100, which is the direction of travel of the incident image light. With such a configuration, the area of the first plane 103a increases with a longer distance from the reflective portion 102, thereby increasing the amount of light reflected by the first plane 103a, thus reducing an uneven brightness depending on the observation position.

In the extraction portion 103 according to another embodiment of the present disclosure, the reflective indexes of the first plane 103a and the second plane 103b sequentially increase with a longer distance from the reflective portion 102. With such a configuration, the amounts of light reflected by the first plane 103a and the second plane 103b increase with a longer distance from the reflective portion 102, thereby reducing the uneven brightness of the image light emitted from the light guide 50. To sequentially increase the reflective indexes of the first plane 103a and the second plane 103b with a longer distance from the reflective portion 102, various coating materials having different reflective indexes are employed such that a suitable coating material is selected according to the reflective index to coat the first plane 103a and the second plane 103b of the extraction portion 103.

Figure 13:
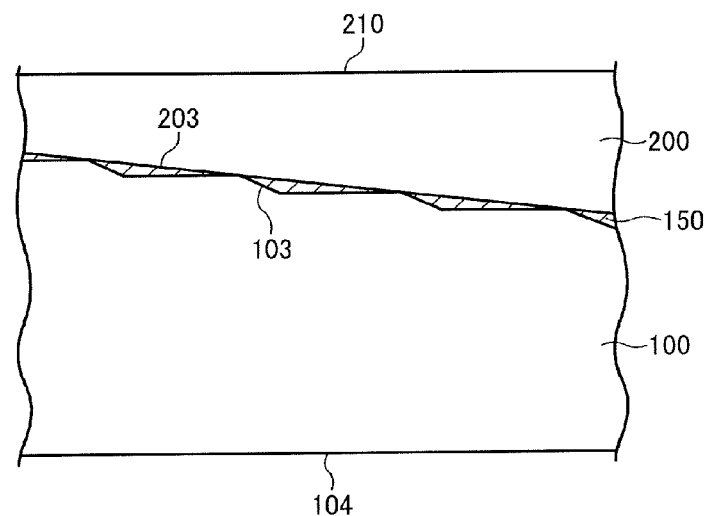
FIG. 13 is an enlarged plan view of a portion of the light guide at which the light-guide member is bonded to the optical member with adhesive according to an embodiment of the present disclosure.

FIG. 13 illustrates the light-guide member 100 bonded to the optical member 200. The optical member 200 is bonded to the extraction portion 103 of the light-guide member 100 with adhesive 150 such that the second front face 210 is maintained to be parallel with the exit portion 104 of the light-guide member 100.

To ensure the see-through characteristics of the light guide 50, the light-guide member 100 and the optical member 200 are made of materials having the same refractive index or refractive indexes as approximate as possible to each other in some embodiments. In some embodiments, the adhesive 150 is made of material having a refractive index the same as or as approximate as possible to the refractive indexes of the materials of the light-guide member 100 and the optical member 200. When the light-guide member 100 and the optical member 200 are made of resin, the adhesive 150 employed for bonding the light-guide member 100 with the optical member 200 has a refractive index ranging from 1.4 through 1.9.

According to the present embodiment, the light-guide member 100 and the optical member 200 are bonded to each other with the adhesive 150 such that an air layer is not formed between the light-guide member 100 and the optical member 200. In this case, the total reflection fails to occur on the second plane 103b of the extraction portion 103. Coating having a reflective property is applied to the extraction portion 103 accordingly. Such a configuration allows the image light to be reflected by the extraction portion 103 and pass through the light-guide member 100.

Figure 14A:
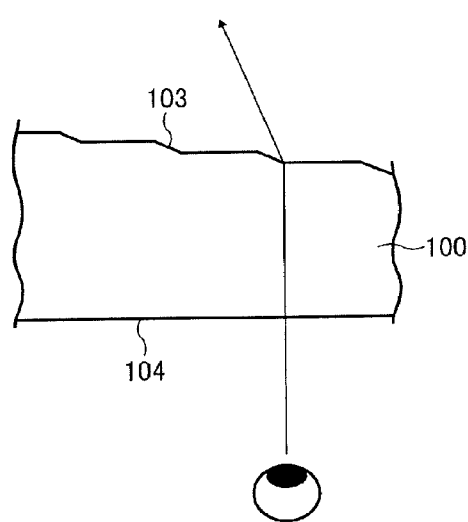
FIG. 14A is an illustration of a light ray passing through the light guide without the optical member.
Figure 14B:
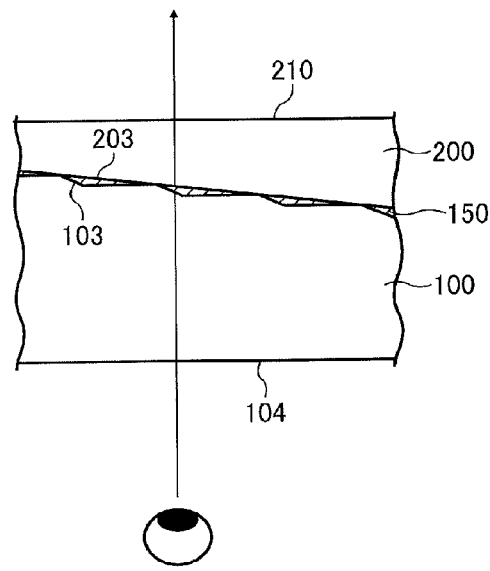
FIG. 14B is an illustration of a light ray passing through the light guide with the optical member.

FIG. 14A is a schematic illustration of refraction of a light ray passing through the light guide 50 without the optical member 200 as viewed by the observer from the outside as a comparative example. FIG. 14B is a schematic illustration of refraction of a light ray passing through the light guide 50 with the optical member bonded to the light-guide member 100 as externally viewed by the observer according to the present embodiment.

As illustrated in FIG. 14A, with the light guide 50 including the light-guide member 100, i.e., without the optical member 200, a light ray in a direction of observation through the exit portion 104 by the observer is refracted at the extraction portion 103. In this case, the viewing direction of the observer does not coincide with the direction of existence of an external actual image, thereby deteriorating the see-through characteristics of the light guide 50. By contrast, the light guide 50 according to the present embodiment has a configuration in which the light-guide member 100 is bonded to the optical member 200. In such a configuration, the light ray in the direction of observation through the exit portion 104 is not refracted as illustrated in FIG. 14A. Thus, in the light guide 50 according to the present embodiment, the viewing direction of the observer coincides with the direction of existence of an external actual image so that successful see-through characteristics are obtained.

It is to be noted that when the fourth plane 203b is not parallel with the second front face 210, the exit portion 104 of the light-guide member 100, and the second plane 103b, the see-through characteristics deteriorates due to the prism effect. By contrast, the light guide 50 according to the present embodiment is configured to have the light-guide member 100 bonded to the optical member 200 such that the exit portion 104, which is a planar surface, is parallel with the second front face 210, which is a planar surface, of the optical member 200. Such a configuration increases the see-through characteristics of the light guide 50.

As described above, with a longer distance from the reflective portion 102 to a position of each first plane 103a, the width of each first plane 103a of the extraction portion 103 increases or the reflective index of a portion of the extraction portion 103 corresponding to the position increases. This reduces the uneven brightness of the light emitted from the exit portion 104. In such a configuration, with a longer distance from the reflective portion 102 of the light-guide member 100, the second front face 210 (parallel plane) of the optical member 200 has a sequentially increasing transmissivity with a longer distance from the reflective portion 102 of the light-guide member 100 in some embodiments. This configuration reduces uneven brightness of an external view as seen through the exit portion 104 of the light-guide member 100 by the observer. To sequentially increase the transmissivity of the second front face 210 of the optical member 200 with a longer distance from the reflective portion 102, any suitable coating material is selected among various coating materials having different transmissivity to coat the extraction portion 103.

Optical Member

Figure 24A:
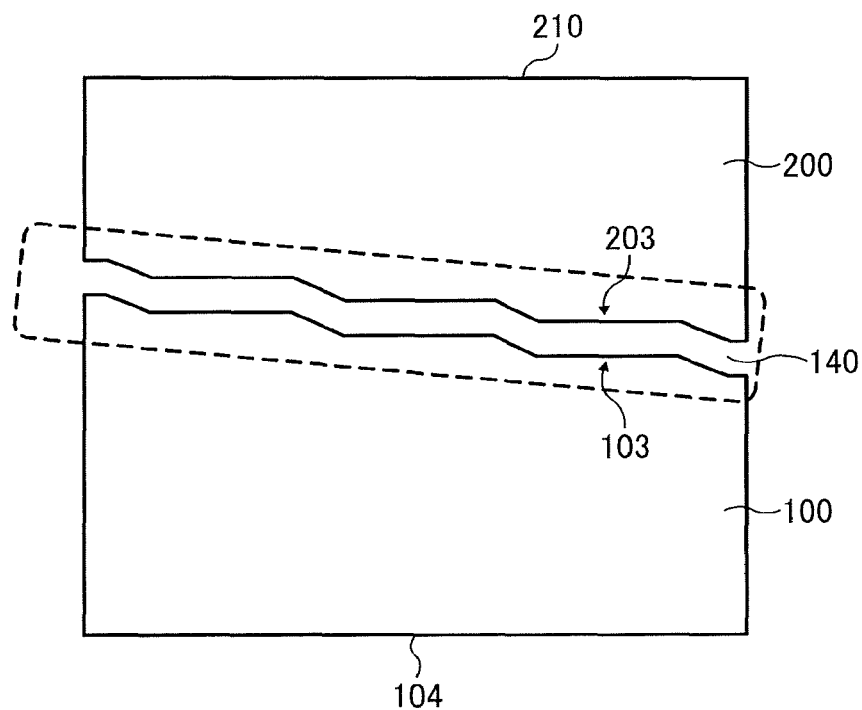
FIG. 24A is a schematic illustration of a light-guide member and an optical member according to an embodiment of the present disclosure.
Figure 24B:
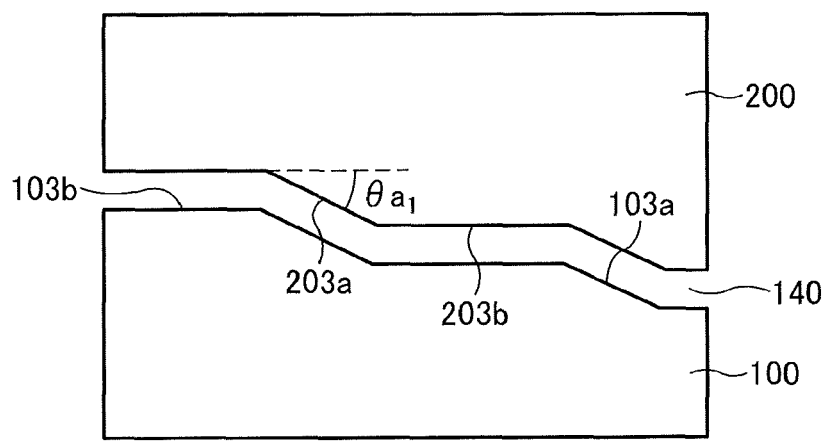
FIG. 24B is an enlarged view of a portion of an extraction portion of the light-guide member and the optical member of FIG. 24A.
Figure 25:
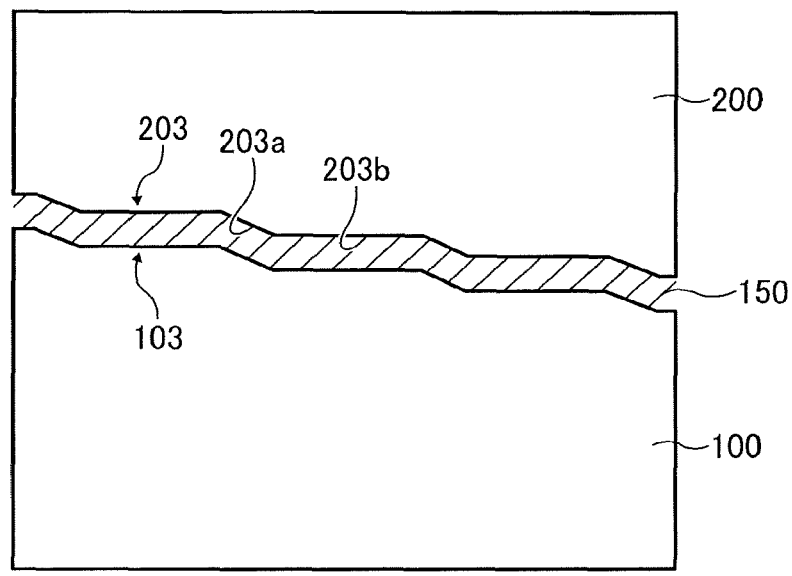
FIG. 25 is an enlarged view of the light-guide member and the optical member of FIG. 24A which are bonded to each other with adhesive.
Figure 26:
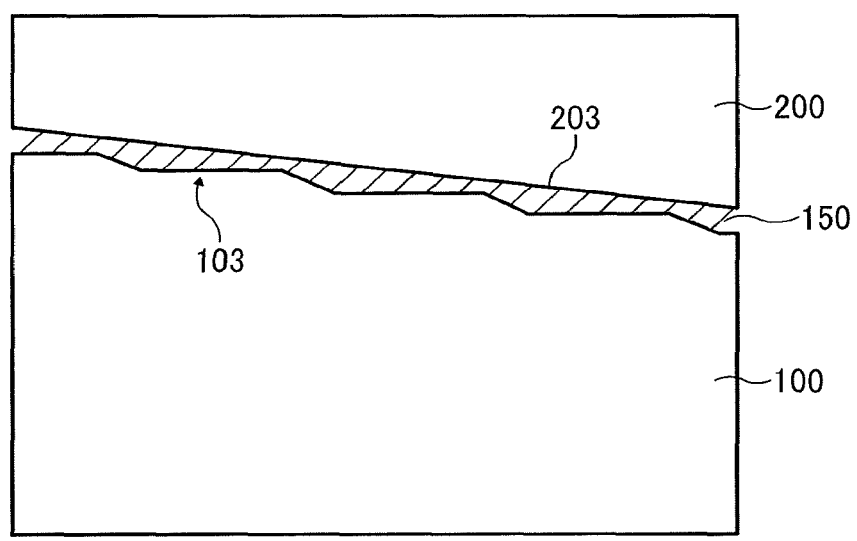
FIG. 26 is an enlarged view of a light-guide member and an optical member which are bonded to each other with adhesive according to another embodiment of the present disclosure.

Next, a description is provided of configuration and arrangement of an optical member 200 relative to a light-guide member 100 according to an embodiment of the present disclosure. FIG. 6B is an enlarged view of a boundary between the light-guide member 100 and the optical member 200. In FIG. 6B, a virtual plane parallel with the second front face 210 of the optical member 200 is indicated by dotted line y. FIGS. 24A, 24B, 25, and 26 each is an enlarged view of the boundary between the light-guide member 100 and the optical member 200. Referring to FIGS. 24A and 24B, the optical member 200 is disposed adjacent to the extraction portion 103 of the light-guide member 100 via an air gap 140 that is an air layer. In FIGS. 25 and 26, the optical member 200 is bonded to the extraction portion 103 of the light-guide member 100 with the adhesive 150.

Figure 6A:
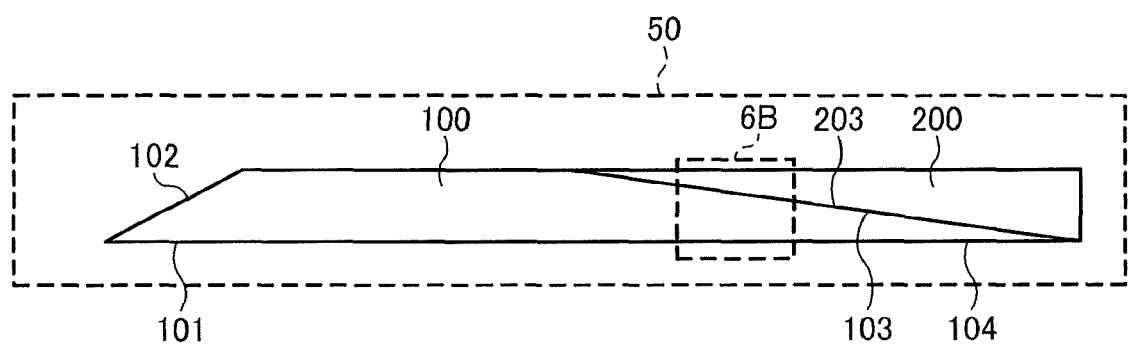
FIG. 6A is a plan view of a boundary between the extraction portion of the light-guide member and an inclined portion of an optical member according to an embodiment of the present disclosure.
Figure 6B:
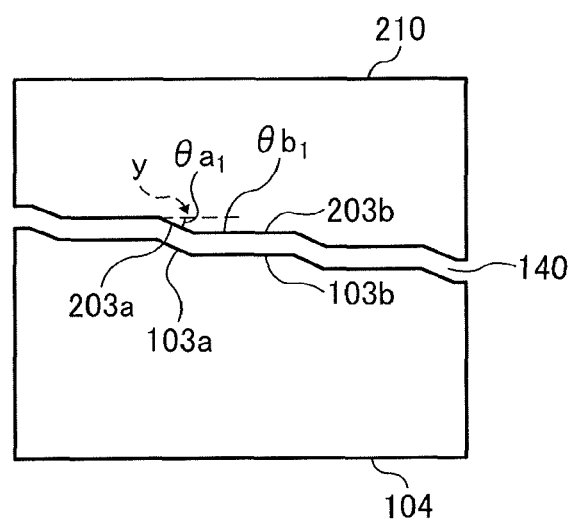
FIG. 6B is an enlarged view of a part of the boundary of FIG. 6A.

As illustrated in FIGS. 6A and 6B, the inclined portion 203 of the optical member 200 is disposed adjacent to the extraction portion 103 of the light-guide member 100 via an air gap 140 that is an air layer. According to the present embodiment of this disclosure, an edge of the extraction portion 103 of the light-guide member 100 and an edge of the inclined portion 203 of the optical member 200 are bonded to each other with a microball adhesive. This allows the air gap 140 to be provided at a uniform interval between the extraction portion 103 and the inclined portion 203, thereby increasing the see-through characteristics of the light guide 50. The same description regarding FIG. 6 applies to FIG. 24B.

In the inclined portion 203 of the optical member 200, a third plane 203a and a fourth plane 203b alternate. The third plane 203a is inclined relative to the second front face 210 by an angle $\theta_{a1}$. The fourth plane 203b is inclined relative to the second front face 210 by an angle $\theta_{b1}$. The third plane 203a is opposed to the first plane 103a. Each fourth plane 203b is opposed to each second plane 103b.

The second front face 210 is parallel with the exit portion 104 of the light-guide member 100. The fourth plane 203b is parallel with the second front face 210, forming an angle $\theta_{b1}$ of 0 degree between the fourth plane 203b and the second front face 210. The fourth plane 203b is also parallel with the exit portion 104 of the light-guide member 100 and with the second plane 103b. In this case, each of the angles $\theta_b$ and $\theta_{b1}$ is 0 degree. Such a configuration increases the see-through characteristics of the light guide 50. It is to be noted that when the fourth plane 203b is not parallel with the second front face 210, the exit portion 104 of the light-guide member 100, and the second plane 103b, the see-through characteristics deteriorate due to the prism effect.

Preferably, the angle $\theta_a$ of inclination of the third plane 203a relative to the second front face 210 is equal to the angle $\theta_a$, that is, the angle of inclination of the extraction portion 103 relative to the exit portion 104. With such a configuration, the third plane 203a of the optical member 200 is made parallel with the first plane 103a of the light-guide member 100, thereby increasing the see-through characteristics of the light guide 50.

To obtain the most advantageous effects of the see-through characteristics of the light guide 50, any deviation between the first plane 103a and the third plane 203a opposed to the first plane 103a is preferably eliminated or reduced when the first plane 103a of the light-guide member 100 shifts in the direction of the normal line of the exit portion 104 (upward in FIG. 6). To eliminate such a deviation, the optical member 200 may include an adjuster to adjust the air gap 140 which is a space between the light-guide member 100 and the optical member 200. Some deviation occurs during assembly. The light guide 50 still maintains the see-through characteristics with a deviation of 10 μm. To eliminate or minimize such a deviation, the optical member 200 may include an adjuster to adjust the air gap 140 that is a space between the light-guide member 100 and the optical member 200.

The light-guide member 100 and the optical member 200 are made of a common material to secure the see-through characteristics of the light guide 50.

The air gap 140 between the extraction portion 103 of the light-guide member 100 and the inclined portion 203 of the optical member 200 may include gas or liquid. With the air gap 140 including air, the see-through characteristics of the light guide 50 increase.

Next, a description is provided of a configuration in which the light-guide member 100 is bonded to the optical member 200 with the adhesive 150 according to an embodiment of the present disclosure. FIG. 25 illustrates an example in which the light-guide member 100 and the optical member 200 of FIGS. 24A and 24B are bonded to each other with the adhesive 150. In the same manner as in FIGS. 24A and 24B, each first plane 103a of the light-guide member 100 is opposed to each corresponding third planes 203a. Such a configuration allows the total reflection of light at the second plane 103b of the light-guide member 100, maintaining the see-through characteristics of the light guide 50.

In some embodiments, the adhesive 150 has a refractive index lower than or equal to the refractive index of the material of the light-guide member 100. When the refractive index of the light-guide member 100 is equal to the refractive index of the adhesive 150, coating such as a half mirror is applied to a bonding boundary between the light-guide member 100 and the adhesive 150. Such a configuration allows the total reflection at the light-guide member 100, thereby maintaining the see-through characteristics of the light guide 50. When the refractive index of the adhesive 150 is greater than the refractive index of the material of the light-guide member 100, the image light is refracted at the adhesive 150, failing to be totally reflected by the light-guide member 100, thereby making it difficult to display a virtual image.

As illustrated in FIG. 26, the light-guide member 100 is bonded to the optical member 200 via the adhesive 150 the same as in FIG. 25. FIG. 26 differs from FIG. 25 in that the inclined portion 203 of the optical member 200, which is opposed to the extraction portion 103 of the light-guide member 100, is an uniform surface in FIG. 26. In FIG. 26 as well, with the adhesive 150 having a refractive index greater than or equal to the refractive index of the light-guide member 100, the light guide 50 maintains high see-through characteristics.

Configuration of Collimator Optical System

Next, a specific description is provided of a configuration of the collimator optical system 300 and the principle of the virtual image optical system VO including the collimator optical system 300 according to an embodiment of the present disclosure.

Referring to FIG. 22, the collimator optical system 300 has a three-group-four-lens configuration in which an aperture stop, a first lens L1, a second lens L2, a third lens L3, and a fourth lens L4 are disposed in order from a light-exit side within the collimator optical system 300, i.e., a position close to the light guide 50 within the collimator optical system 300. In this example of FIG. 22, the first lens L1 is a negative meniscus lens having a concave surface toward the light-guide side. The second lens L2 and the fourth lens L4 each is a positive lens having convex surfaces on both sides. The third lens L3 is a negative lens having concave surface on both sides. The third lens and the fourth lens L4 are cemented to each other.

Figure 27:
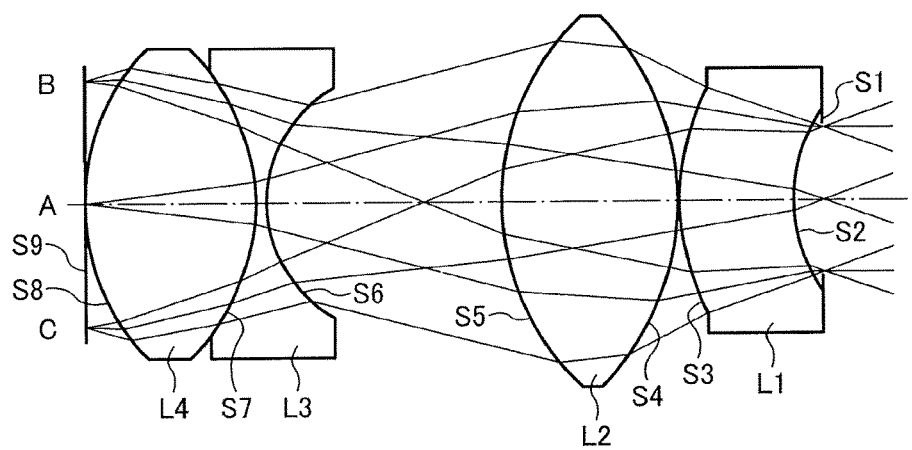
FIG. 27 is a schematic view of an optical arrangement of a collimator optical system for use in a virtual image optical system according to an embodiment of the present disclosure.

It is to be noted that, the surface of the image display element 10, which is an image display surface S9, is in contact with the fourth lens L4 in FIG. 27. The image display element 10 is disposed away from the fourth lens L4 by a predetermined distance (refer to FIG. 19) in some embodiments.

Figure 28:
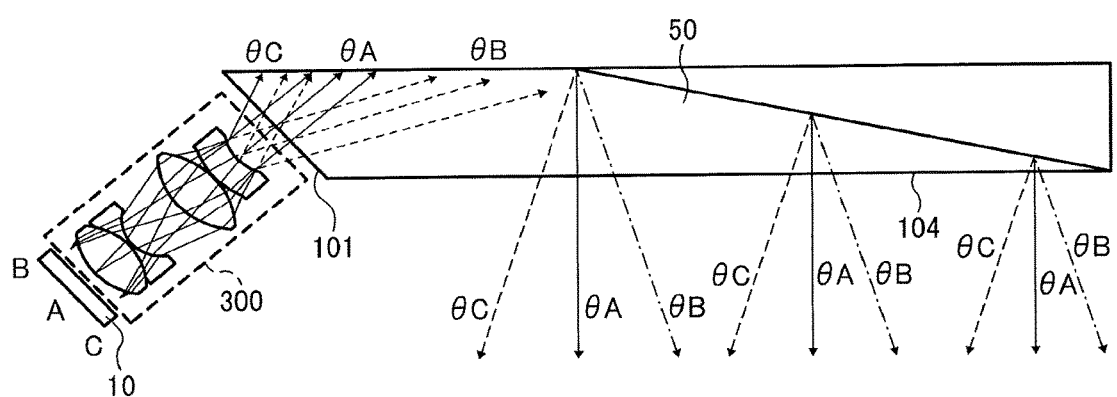
FIG. 28 is an illustration of the principle of the virtual image optical system with optical paths according to an embodiment of the present disclosure.

As illustrated in FIGS. 27 and 28, when the image light output from the image display element 10 passes through the collimator optical system 300, the collimator optical system 300 converts the positional data of the image light into data regarding angle, outputting the image light with the converted data regarding angle to the light guide 50. The image light output from the collimator optical system 300 enters the incidence portion 101 of the light guide 50, to be output to the outside from the exit portion 104 of the light guide 50. The output angle at which the image light is output from the exit portion 104 of the light guide 50 is maintained equal to the incident angle at which the image light output from the collimator optical system 300 enters the incidence portion 101 of the light guide 50.

It is to be noted that when the incident angle is not equal to the output angle, the image light formed by image display element 10 fails to form an appropriate virtual image.

More specifically, as illustrated in FIGS. 27 and 28, the image display element 10 outputs image light including light rays A output from the center portion of the image display element 10 and light rays B and C output from the edges of the image display element 10. The light rays A, B, and C, each of which has the positional data of the image light, are converted by the collimator optical system 300 into the light rays $\theta_A$, $\theta_B$, and $\theta_C$, respectively representing data regarding angle. The light image including the light rays $\theta_A$, $\theta_B$, and $\theta_C$ is output from the collimator optical system 300, entering the incidence portion 101 of the light guide 50. At this time, the light rays A of the image light enter the incidence portion 101 at the angle $\theta_A$. The light rays B of the image light enter the incidence portion 101 at the angle $\theta_B$. The light rays C of the image light enter the incidence portion 101 at the angle $\theta_C$. To facilitate understanding each light ray, in FIG. 28, the light rays $\theta_A$ corresponding to the light rays A are represented by solid lines and the light rays $\theta_B$ corresponding to the light rays B are represented by chain lines. The light rays $\theta_C$ corresponding to the light rays C are represented by dotted lines.

As described above, the light rays A, B, and C of the image light having entered the incidence portion 101 are guided into the light guide 50. When exiting the light guide 50 through the exit portion 104, the light rays A, B, and C of the image light maintain the incident angles $\theta_A$, $\theta_B$, and $\theta_C$, respectively.

As described above, when exiting the light guide 50 through the exit portion 104, the light rays of the image light output from the collimator optical system 300 maintain the respective incident angles, i.e., the data regarding angle. Thus, the light guide 50 displays a high-quality virtual image.

Examples of Collimator Optical System

A description is provided of the collimator optical system 300, which exhibits the advantageous effects described above, according to an Example. The collimator optical system 300 of FIG. 12, which has a three-group-four-lens configuration, has a focal length of 10.0 mm, an F number of 1.56, a total length of 21.9 mm, and output angle of 20 degrees at maximum.

Table 1 represents the numerical data regarding radius of curvature R, thickness D between lenses, refractive index Nd of d-line, and Abbe number νd in the collimator optical system 300 according to an Example.

TABLE 1

| Surface Numbers | R | D | Nd | νd | Lens |
|---|---|---|---|---|---|
| S1 (Stop) | — | 1.50 | | | |
| S2* | −4.090 | 2.40 | 1.9460 | 17.98 | L1 |
| S3* | −6.470 | 0.03 | | | |
| S4* | 5.863 | 6.50 | 1.4974 | 81.50 | L2 |
| S5* | −8.495 | 5.37 | | | |
| S6 | −5.341 | 0.54 | 1.6647 | 27.03 | L3 |
| S7 | 4.151 | 5.60 | 1.8822 | 40.85 | L4 |
| S8* | −11.445 | 0.10 | | | |
| S9 (Display Element) | — | — | | | |

In Table 1, the surface number is counted in order from the light-exit side in FIG. 12, which means that the surface of the aperture stop is S1 and the surface of the image display element 10, i.e., an image display surface is S9. In Table 1, the mark "*" is indicated at surface numbers of "aspherical surfaces". In the present Example, the first lens L1 and the second lens L2 corresponding to the surface numbers S2 through S5, each has aspherical surfaces on both sides. The third lens L3 corresponding to the surface numbers S6 and S7 has spherical surfaces on both sides. Further, the light-exit-side surface corresponding to the surface number S7 of the fourth lens L4 is a spherical surface. The light-incidence-side surface corresponding to the surface number S8 of the fourth lens L4 is an aspherical surface.

Table 2 represents numerical values of aspherical surfaces.

TABLE 2

|     | S2          | S3          | S4          | S5          | S8          |
|-----|-------------|-------------|-------------|-------------|-------------|
| K   | 0           | 0           | 0           | 0           | 4.1787E+00  |
| C4  | 3.3386E−03  | 8.0846E−04  | −1.4944E−03 | 7.0642E−05  | −1.1177E−04 |
| C6  | 4.5738E−05  | 3.9755E−06  | −1.5615E−05 | −1.2738E−05 | 3.9561E−04  |
| C8  | −7.3040E−06 | −3.5313E−07 | 1.1711E−06  | 6.0025E−07  | −4.7418E−05 |
| C10 | 8.6029E−07  | 6.2372E−08  | −4.5545E−08 | −1.1631E−08 | 2.0884E−06  |

In Table 2, the symbols "S2", "S3", "S4", "S5", and "S8" of the upper stage denotes the surface numbers of the aspherical surfaces. K denotes a constant of the cone, and "C4, C6, C8, C10 . . . " refer to aspherical surface coefficients.

The aspherical surface is defined by the following numerical expression, using a conic constant and an aspherical surface coefficient:

$$X = (H^2/R)/[1+\{1-K(H/r)^2\}^{1/2}] + C4 \cdot H^4 + C6 \cdot H^6 + C8 \cdot H^8 + C10 \cdot H^{10} + \ldots$$

In the numerical expression, X denotes a displacement along the direction of the optical axis at a position of a height H from the optical axis to the peak of a surface as a reference point. The symbols "C4, C6, C8, C10 . . . " refer to aspherical surface coefficients.

The collimator optical system 300 according to the present Example has a three-group-four-lens configuration. The present disclosure is not limited to this configuration. Alternatively, in some Examples, the collimator optical system 300 may have another configuration, such as a two-lens configuration or a five-or-more-lens configuration.

In the present Example, the aperture stop is disposed at a position closest to a position at which the image light exits the collimator optical system 300. The "position closest to a position at which the image light exits the collimator optical system 300" is hereinafter referred to as a "position closest to the light-exit position in the collimator optical system 300" or a "position closest to the light guide 50 in the collimator optical system 300". In some embodiments in which the collimator optical system 300 is combined with the light guide 50, the aperture stop of the collimator optical system 300 is disposed at the position closest to the light-exit position in the collimator optical system 300 or at the position closest to the light guide 50. The data regarding image from the image display element 10 is telecentric.

In the Examples of the present disclosure, the F number of the collimator optical system 300 is 1.56. In some embodiments, the F number is approximately 3.0. In some embodiments, the F number of the collimator optical system 300 satisfies conditional formula (1):

$$1.5 < F \text{ number} < 3.0. \quad (1)$$

With an F number of lower than or equal to 1.5, the diameter of the collimator optical system 300 increases. This leads to an increase in the light guide 50 in size. By contrast, with an F number of greater than or equal to 3.0, a compact light guide 50 is provided. This, however, reduces the degree of brightness of a virtual image.

Examples of Light Guide

Next, the following represents the numerical values regarding the light guide 50 according to Examples 1 and 2.

In the light guide 50 according to Examples 1 and 2, the light-guide member 100 and the optical member 200 each is made of plastics having a refractive index (Nd) of 1.54. In Examples 1 and 2, the first plane 103a of the extraction portion 103 forms an angle $\theta_a$ of 30 degrees relative to the exit portion 104 in the light-guide member 100.

In Example 1, the light-guide member 100 has a thickness t of 1 mm and the second plane 103b of the extraction portion 103 has a width w of 2.20 mm.

In Example 2, the light-guide member 100 has a thickness t of 4 mm and the second plane 103b of the extraction portion 103 has a width w of 0.90 mm.

The light guide 50 according to Example 1 is reduced in weight and the light guide 50 according to Example 2 provides an appropriate amount of light. The light guide 50 according to both Examples 1 and 2 achieves a horizontal viewing angle of 40 degrees with an eye relief of 19 mm and an eye box of 5 mm. The angles listed above are expressed by absolute values.

The width w of the second plane 103b according to Example 2 is narrower than the width w of the second plane 103b according to Example 1. In Example 2, with such a narrower width w of the second plane 103b, the width of the first plane 103a of the extraction portion 103 decreases, thereby increasing the density of light rays emitted from the exit portion 104. As a result, a reduction in amount of light at the position of the apple of the user's eye is prevented.

The light guide 50 according to Example 1 may be combined with the light guide 50 according to Example 2 as a variation. Specifically, the light-guide member 100 has a thickness t of 1 mm and the second plane 103b of the extraction portion 103 has a width w of 0.90 mm in some embodiments. Alternatively, in some embodiments, the light-guide member 100 has a thickness t of 4 mm and the second plane 103b of the extraction portion 103 has a width w of 2.20 mm.

According to the Examples described above, when the image light output from the image display element 10 passes through the collimator optical system 300, the collimator optical system 300 converts the positional data of the image light into data regarding angle. The image light with the data regarding angle converted by the collimator optical system 300 enters the incidence portion 101 of the light guide 50. When exiting the light guide 50 through the exit portion 104, the image light still maintains the incident angle which is the data regarding angle converted by the collimator optical system 300. Thus, the light guide 50 displays a high-quality virtual image. The configurations according to the embodiments described above provide a compact transmissive light guide 50 with a wide viewing angle of greater than or equal to 40 degrees, having a successful see-through characteristics.

Variations of Light-Guide Member

The following describes other configurations of the light-guide member 100 according to variations of the present disclosure, referring to FIGS. 7, 8, 29 and 30.

The extraction portion 103 of FIGS. 6A and 6B according to the above-described embodiment has a two-plane configuration including the first plane 103a and the second plane 103b. That is, in the extraction portion 103 according to the above-described embodiment, the first plane 103a is inclined relative to the exit portion 104 by the angle $\theta_a$. The second plane 103b is inclined relative to the exit portion 104 by the angle $\theta_b$. The first plane 103a and the second plane 103b alternate to form a stepwise shape.

Figure 7A:
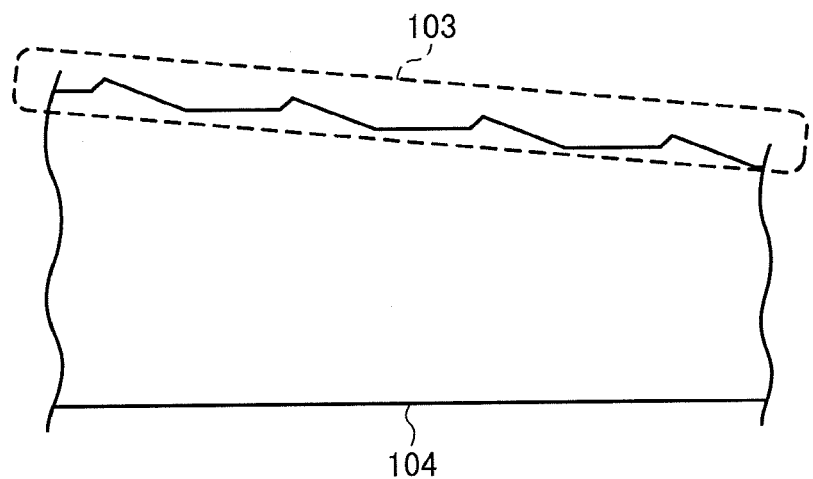
FIG. 7A is a schematic illustration of a part of an extraction portion of a light-guide member according to another embodiment of the present disclosure.
Figure 7B:
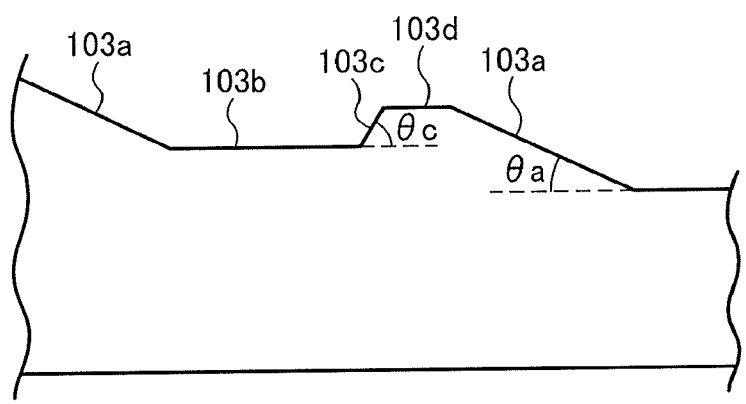
FIG. 7B is an enlarged view of the part of the extraction portion of the light-guide member of FIG. 7A.

The extraction portion 103 of FIG. 7 according to a variation of the present embodiment of the present disclosure has a four-plane configuration, forming a saw-toothed shape. Specifically, in the extraction portion 103 according to the present variation, the first plane 103a, the second plane 103b, an inclined plane (fifth plane) 103c, and a flat plane (sixth plane) 103d are arranged in this recited order. The first plane 103a is inclined relative to the exit portion 104 by the angle $\theta_a$. The second plane 103b is inclined relative to the exit portion 104 by an angle $\theta_b$. The fifth plane 103c is inclined relative to the exit portion 104 by an angle $\theta_c$. The sixth plane 103d is inclined relative to the exit portion 104 by an angle $\theta_d$. Both of the first plane 103a and the fifth plane 103c of the extraction portion 103 according to the present variation are inclined upward from a reference plane parallel with the exit portion 104 in the directions opposite to each other.

Among the four planes described above, the function and optimal ranges of the first plane 103a and the second plane 103b are the same as the function and optimal ranges of the first plane 103a and the second plane 103b according to the above-described embodiment.

The fifth plane 103c ensures an increased area of the first plane 103a and increases a flexural strength of the light-guide member 100.

The angle $\theta_c$ formed by the fifth plane 103c and the exit portion 104 is greater than 0 degree and less than or equal to 90 degrees. With an angle $\theta_c$ of 0 degree, the fifth plane 103c is in the same plane as the second plane 103b, that is, a part of the second plane 103b so that the extraction portion 103 has the same configuration as the configuration according to the above-described embodiment. Preferably, the angle $\theta_c$ ranges from 45 degrees through 90 degrees. Further, the angle $\theta_c$ is preferably in a range that prevents the image light output from the image display element 10 from impinging on the fifth plane 103c to prevent diffusion of the image light at the fifth plane 103c.

The sixth plane 103d maintains the see-through characteristics of the light guide 50. The angle $\theta_d$ of inclination of the sixth plane 103d relative to the exit portion 104 is 0 degree. That is, the sixth plane 103d is parallel with the exit portion 104. With an angle $\theta_d$ of 0 degree, in some embodiments, the sixth plane 103d may reflect the image light output from the image display element 10 in the same manner as the second plane 103b does.

According to another variation of the light-guide member 100 of FIG. 7, the extraction portion 103 may have a three-plane configuration (the first plane 103a, the second plane 103b, and the fifth plane 103c) in which the first plane 103a and the fifth plane 103c extend upward to meet with each other. That is, in the extraction portion 103 according to the above-described embodiment, the first plane 103a and the exit portion 104 form the angle $\theta_a$. The second plane 103b and the exit portion 104 form an angle $\theta_b$. The first plane 103a and the second plane 103b alternate to form a stepwise shape.

With the extraction portion 103 having a three-plane configuration or four-plane configuration, a relatively wider area of the first plane 103a is obtained than the area of the first plane 103a of FIG. 6 according to the above-described embodiment. The first plane 103a having a relatively wider area receives a relatively more amount of image light to be emitted through the exit portion 104. With the three-plane configuration or four-plane configuration, the flexural strength increases, which is advantageous for particularly the light-guide member 100 made of resin. That is, with the light-guide member 100 made of resin, the flexural strength of the light-guide member 100 decreases around the tip of the light-guide member 100 at which the light-guide member 100 is thin. Adding the fifth plane 103c to the light-guide member 100 increases the flexural strength of the light-guide member 100.

Figure 8A:
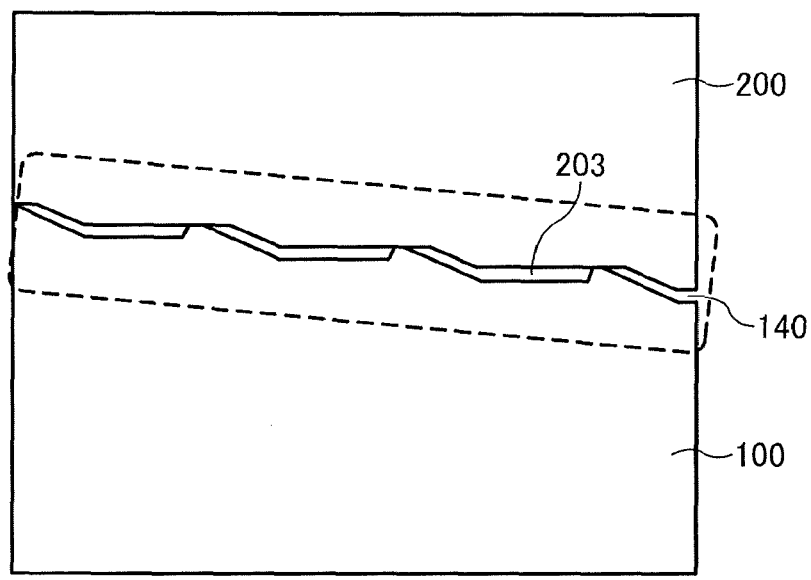
FIG. 8A is a plan view of the arrangement of the light-guide member of FIG. 7 and an optical member according to another embodiment of the present disclosure.
Figure 8B:
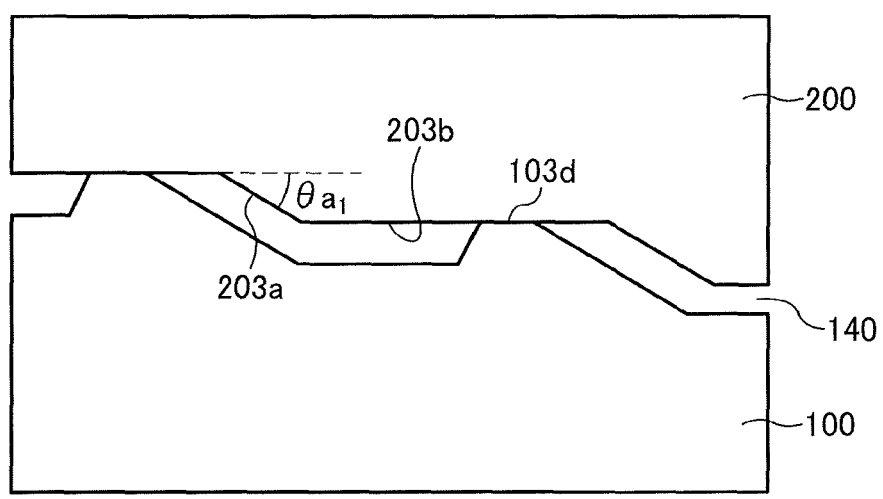
FIG. 8B is an enlarged view of a part of the extraction portion of the light-guide member of FIG. 8A.
Figure 29:
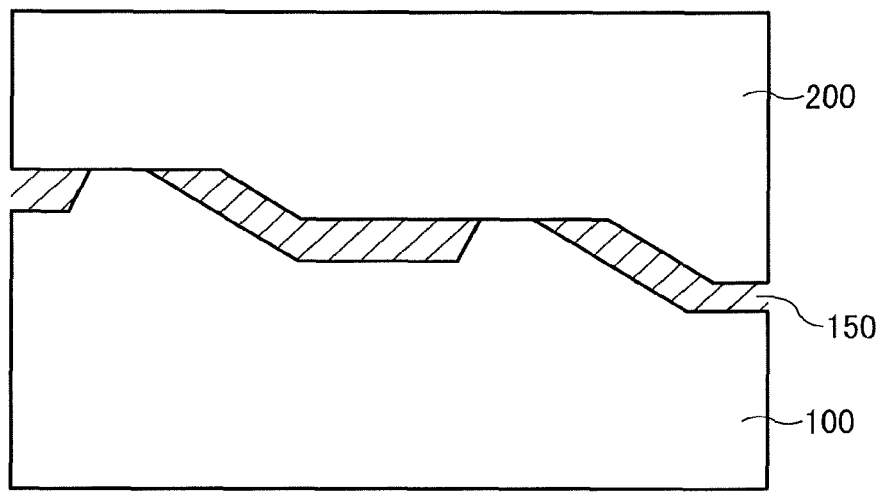
FIG. 29 is an enlarged view of the optical member and the light-guide member of FIG. 7 which are bonded with adhesive according to an embodiment of the present disclosure.
Figure 30:
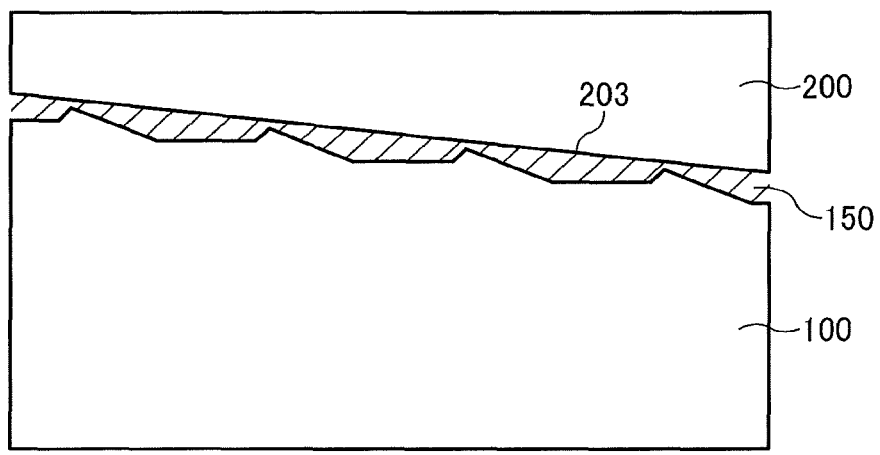
FIG. 30 is an enlarged view of the optical member and the light-guide member of FIG. 7 which are bonded with adhesive according to another embodiment of the present disclosure.

Each of FIGS. 8A and 8B is an enlarged view of the boundary between the light-guide member 100 and the optical member 200 when the extraction portion 103 has a four-plane configuration according to another variation. As illustrated in FIGS. 8A and 8B, the optical member 200 is disposed adjacent to the extraction portion 103 of the light-guide member 100 via an air gap 140 that is an air layer. In the examples of FIGS. 29 and 30, the inclined portion 203 of the optical member 200 is bonded to the light-guide member 100 of the extraction portion 103 with the adhesive 150.

In the example of FIG. 8 and FIG. 29, the optical member 200 includes the inclined portion 103 as described in FIG. 6. That is, the inclined portion 203 of the optical member 200 has a two-plane configuration in which the third plane 203a and the fourth plane 203b alternate. The third plane 203a and the second front face 210 form an angle $\theta_{a1}$. The fourth plane 203b and the second front face 210 form an angle $\theta_{b1}$. The same description applies to the angles $\theta_{a1}$ and $\theta_{b1}$ as described in FIG. 6. The angle $\theta_a$ is equal to the angle $\theta_{a1}$ and the angle $\theta_b$ is equal to $\theta_{b1}$. With the adhesive having a refractive index greater than or equal to the refractive index of the light-guide member 100, high see-through characteristics are maintained.

In FIG. 30, the inclined portion 203 of the optical member 200 has a uniform surface same as in FIG. 26. The adhesive 150 has a refractive index lower than or equal to the refractive index of the material of the light-guide member 100, to maintain high see-through characteristics of the light guide 50.

The three-plane configuration or the four-plane configuration of the extraction portion 103 further including at least one of the fifth plane 103c and the sixth plane 103d according to the present variations is not limited to a configuration in which the three-plane configuration or the four-plane configuration is applied to all of the extraction portion 103. The three-plane configuration or the four-plane configuration may be applied to a part of the extraction portion 103 in some embodiments. That is, at least one of the fifth plane 103c and the sixth plane 103d may be added to any position to secure the amount of light or the flexural strength in the configuration of the extraction portion 103 of FIG. 6 in which the first plane 103a and the second plane 103b alternates.

With the extraction portion 103 having the three-plane configuration or the four-plane configuration, the inclined portion 203 of the optical member 200, which is opposed to the extraction portion 103, may be adjusted to the shape of the extraction portion 103 with the three-plane configuration or with four-plane configuration. In such a case, with the extraction portion 103 and the inclined portion having a shape in which no deviation is observed between the first plane 103a and the third plane 203a opposed to the first plane 103a when the first plane 103a of the light-guide member 100 shifts in the direction of the normal line of the exit portion 104 (upward in FIG. 6) to the third plane 203a, a successful see-through characteristics of the light-guide member 100 is obtained. To eliminate such a deviation, the optical member 200 may include an adjuster to adjust a space between the light-guide member 100 and the optical member 200.

Figure 15:
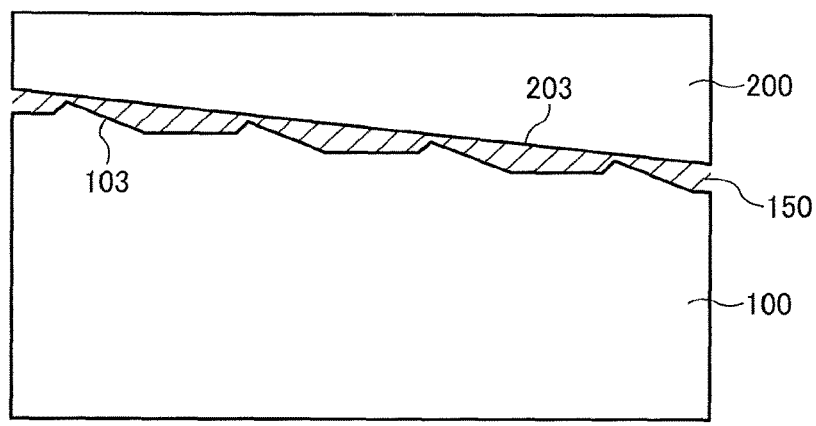
FIG. 15 is an enlarged plan view of a portion of the light guide at which the light-guide member is bonded to the optical member with adhesive according to another embodiment of the present disclosure.

FIG. 15 is an enlarged view of the boundary between the light-guide member 100 and the optical member 200 when the extraction portion 103 has a four-plane configuration according to another variation. In the example of FIG. 15 as well, the inclined portion 203 of the optical member 200 may be bonded to the extraction portion 103 of the light-guide member 100 with the adhesive 150.

The configurations according to the embodiments described above allow a compact light guide with a wide viewing angle of greater than or equal to 40 degrees.

In the embodiments illustrated in FIGS. 1 through 8, a description is given of the example in which the incidence portion 101 is disposed on the left of an observer of a virtual image, allowing light image to enter the light-guide member 100 from the left as seen from the observer. When the incidence portion 101 is disposed on the opposite side, i.e., on the right of the observer, allowing the image light to enter the light-guide member 100 from the right side as seen from the observer, the same advantageous effects are obtained as described above.

Figure 9A:
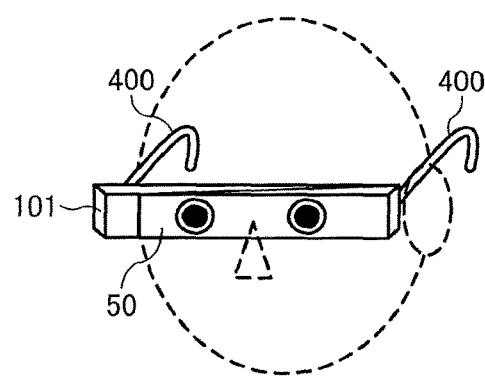
FIG. 9A is a schematic view of an integrated binocular HMD including a light guide according to an embodiment of the present disclosure.
Figure 9B:
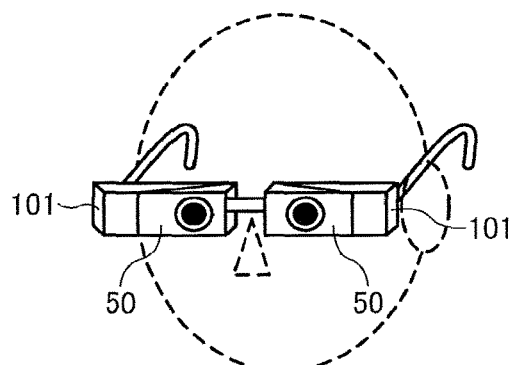
FIG. 9B is a schematic view of monocular HMDs mounted for the respective eyes, each including the light guide according to an embodiment of the present disclosure.
Figure 9C:
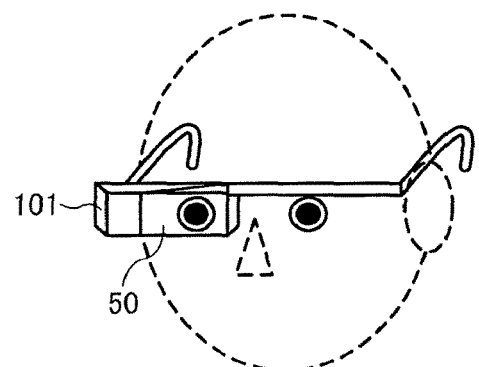
FIG. 9C is a schematic view of a monocular HMD mounted for either eye including the light guide according to an embodiment of the present disclosure.

FIGS. 9A, 9B, and 9C each is an illustration of a spectacle virtual image display device, i.e., a head mounted display (HMD), including the light guide 50.

FIG. 9A is an illustration of a binocular HMD including one light guide 50 in which the incidence portion 101 of the light-guide member 100 is disposed on the right as seen from the observer (user). The light guide 50 according to the embodiments of the present disclosure is fixed to a pair of temples 400 that hang the light guide 50 from the ears of the user. FIGS. 9A, 9B, and 9C each is a simplified illustration of the temples 400. The temples 400 have a shape that covers either edges, the upper edge, or the lower edge of the light guide 50.

FIGS. 9B and 9C each is an illustration of a monocular HMD including one compact light guide 50. In FIG. 9B, a user is wearing a virtual image display device VD including two light guides 50, 50 corresponding to the respective eyes. In this case, the incidence portion 101 of one light guide 50 corresponding to the right eye of the user is disposed on the right as seen from the user. The incidence portion 101 of another light guide 50 corresponding to the left eye of the user is disposed on the left as seen from the user.

The pair of temples 400 may include a virtual image optical system VO and a light source LS in some embodiments. That is, in the examples of FIGS. 9A and 9C, the light source LS, the image display element 10, and the collimator optical system 300 are disposed on one temple 400 on the right. In the example of FIG. 9B, the light source LS, the image display element 10, and the collimator optical system 300 are disposed on the temples 400 on either sides.

In the embodiments of the present disclosure described above, the light guide 50 is applied to the spectacle HMD. Alternatively, in some embodiments, the light guide 50 may be applied to other types of HMDs. Alternatively, in some embodiments, the light guide 50 may be applied to a head up display (HUD). The light guide 50 is suitable for displaying a virtual image of an original image formed by the light rays optically modulated by a micro device.

The configurations according to the embodiments described above provide a compact transmissive light guide with a wide viewing angle of greater than or equal to 40 degrees and a virtual image display device including such a compact light guide.

Examples of Virtual Image Display Device

Figure 10:
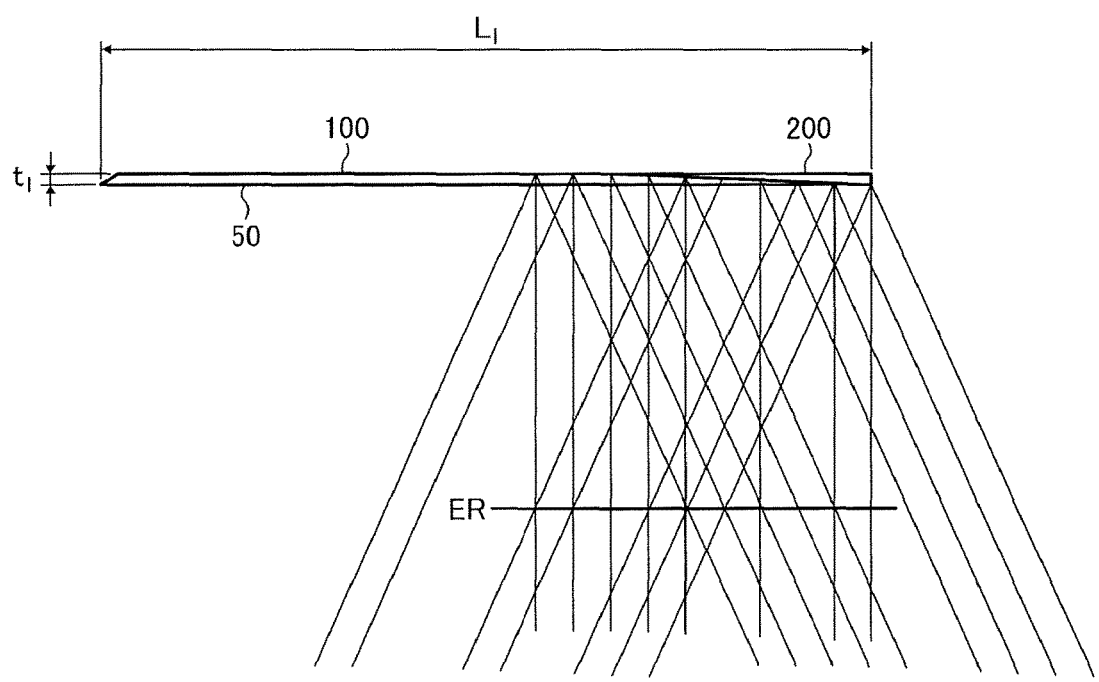
FIG. 10 is a plan view of a virtual image display device according to Example 1 with the light guide according to an embodiment of the present disclosure.
Figure 11:
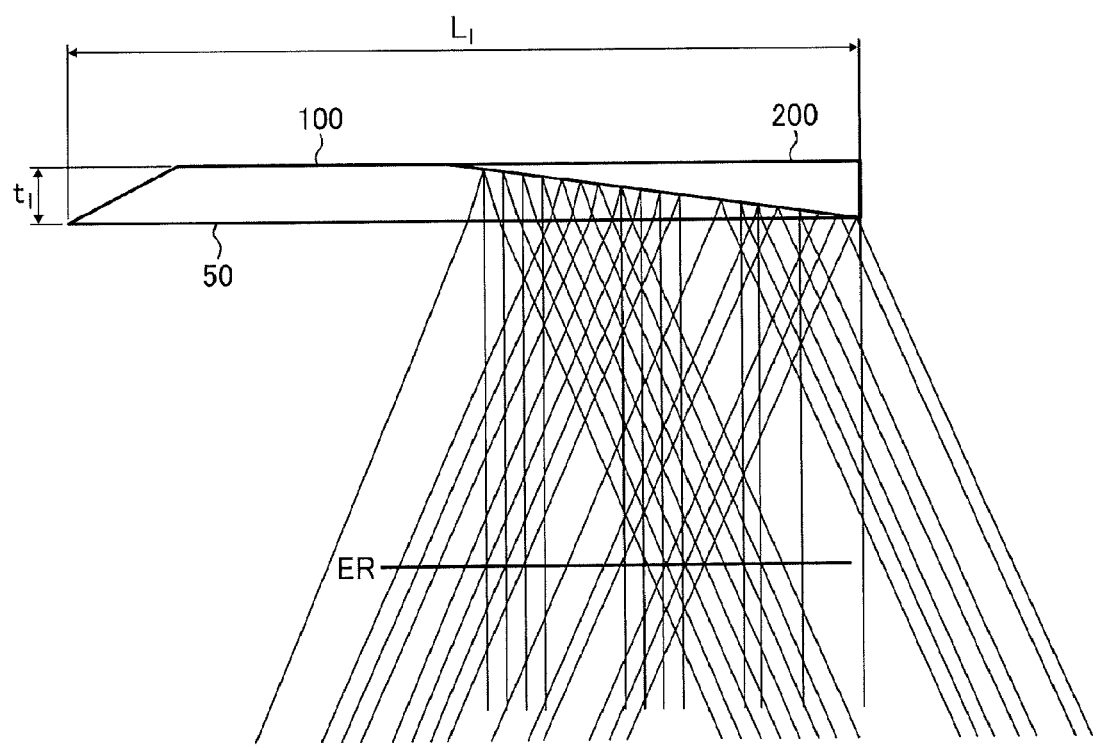
FIG. 11 is a plan view of a virtual image display device according to Example 2 with the light guide according to an embodiment of the present disclosure.

A description is provided of a virtual image display device VD according to Examples 1 and 2 including the light guide 50 illustrated in FIGS. 1 through 6, referring to FIGS. 10 and 11. FIGS. 10 and 11 illustrate the light rays of the image light emitted from the light guide 50 according to Examples 1 and 2, respectively. Each of FIGS. 10 and 11 illustrates the line ER referring to the position of the eye relief, the thickness $t_1$ of the light guide 50, and the length $L_1$ of the light guide 50 in the longitudinal direction. The image display element 10 and the collimator optical system 300 are omitted from FIGS. 10 and 11. The angles listed below are expressed by absolute values.

Figure 16:
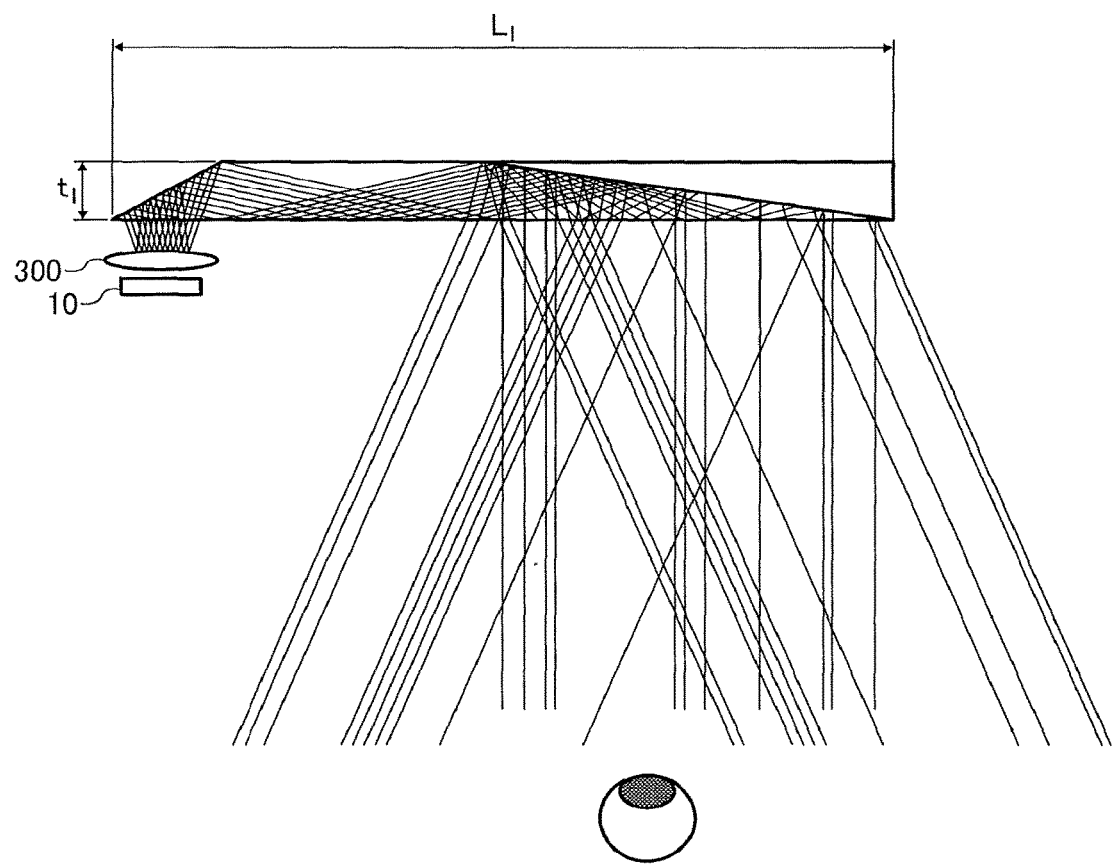
FIG. 16 is an illustration of a virtual image display device according to one Example including the light guide according to an embodiment of the present disclosure.
Figure 17:
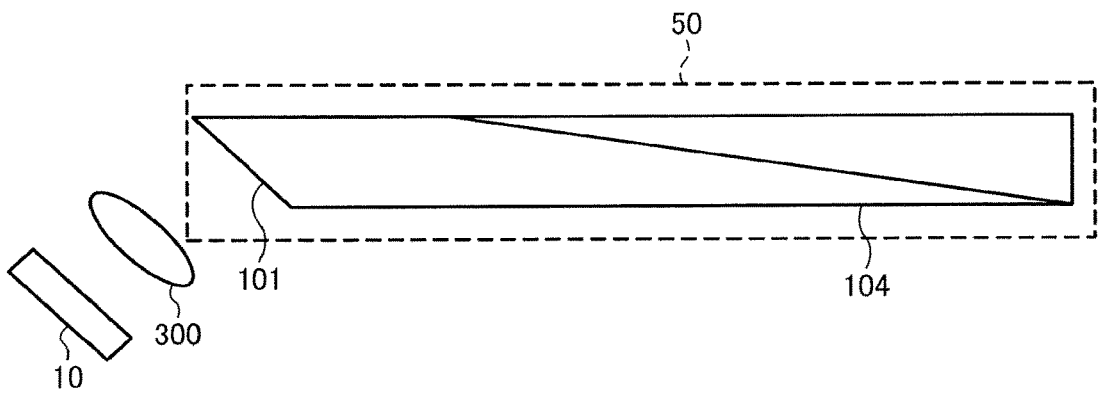
FIG. 17 is a plan view of a virtual image optical system according to another embodiment of the present disclosure, illustrating the relative positions of an image display element, a collimator optical system, and a light guide.

A description is further provided of the virtual image display device VD according to Examples 1 and 2 including the light guide 50 illustrated in FIGS. 12, 13, and 14, referring to FIG. 16. FIG. 16 is a schematic illustration of the observer's eyes and optical paths OP of the image light passing through the light guide 50 in the virtual image display device VD according to another Example of the present disclosure. The angles listed below are expressed by absolute values.

Example 1

Example 1 of FIG. 10, the light guide 50 has a thickness $t_1$ of 1 mm, a length $L_1$ in the longitudinal direction of 50 mm, a width of 40 mm, an angle $\theta_0$ of 30 degrees, and a refractive index (Nd) of 1.54 (plastics). When the light guide 50 has a horizontal viewing angle of greater than or equal to 45 degrees, the second plane 103b has a width w of 2.20 mm to obtain an eye box of greater than or equal to 5 mm with an eye relief of 19 mm.

In Example 1, the light guide 50 has a thickness of 1 mm, achieving a reduction in weight. Accordingly, the light guide 50 according to Example 1 is suitable for the virtual image display device VD including one light guide 50 for each eye of FIGS. 9B and 9C.

Example 2

In Example 2 of FIG. 11, the light guide 50 has the same length $L_1$, width, an angle $\theta_0$, and refractive index (Nd) as those of Example 1. The light guide 50 of Example 2 has a thickness $t_1$ of 4 mm. In Example 2, when the light guide 50 has a horizontal viewing angle of greater than or equal to 45 degrees, the second plane 103b has a width w of 0.90 mm to obtain an eye box of greater than or equal to 5 mm with an eye relief of 19 mm.

In Example 2, the second plane 103b has a narrower width than the second plane 103b of Example 1. Such a configuration increases the density of amount of light at the position of the apple of the user's eye, as compared to Example 1 illustrated in FIG. 10.

As described above, the width of field of view that allows a virtual image to be sighted is referred to as "eye box". The distance from the exit portion 104 to the eye balls of a user (observer) to allow the user to sight a virtual image is referred to as "eye relief". In another Example of FIG. 16, the light guide 50 has a thickness $t_1$ of 4 mm, a length $L_1$ in the longitudinal direction of 50 mm, a width of 30 mm, an angle $\theta_0$ of 30 degrees, and a refractive index (Nd) of 1.53. In this case, the light guide 50 is made of plastic material. Further, a virtual image display device VD dedicated for either eye is manufactured in which the light guide 50 included has a horizontal viewing angle of greater than or equal to 45 degrees, an eye relief of more than or equal to 15 mm, and an eye box of 5 mm.

With the virtual image display device VD according to the present Example of this disclosure, the image light emitted from the exit portion 104 has a uniform brightness, thereby creating a successful virtual image.

According to the embodiments and Examples described above provide a compact transmissive light guide with a wide viewing angle of greater than or equal to 40 degrees, a virtual optical system that achieves a compact light guide, and a virtual image display device including such a compact light guide to reduce uneven brightness.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A light guide comprising:
a light-guide member including:
an incidence portion through which image light output from an image display element enters the light-guide member;
an exit portion to emit the image light to an outside of the light-guide member;
a reflective portion inclined relative to the incidence portion to guide the image light having entered the light guide through the incidence portion, into the light guide; and
an extraction portion including at least one first plane inclined relative to the exit portion and at least one second plane parallel with the exit portion, to guide the image light from the at least one first plane to the exit portion and extract the image light, the at least one first plane and the at least one second plane alternating in the extraction portion; and
an optical member integrated with the light-guide member, the optical member including:
a parallel plane parallel with the exit portion; and
an inclined portion inclined relative to the parallel plane,
wherein the inclined portion of the optical member includes at least one third plane inclined relative to the parallel plane and at least one fourth plane parallel with the parallel plane, and
wherein the at least one third plane and the at least one fourth plane alternate in the inclined portion of the optical member.

2. The light guide according to claim 1,
wherein the at least one first plane is inclined relative to the exit portion in a direction opposite to a direction of inclination of the reflective portion relative to the incidence portion, and
wherein an angle of inclination of the at least one first plane relative to the exit portion is equal to an angle of inclination of the reflective portion relative to the incidence portion.

3. The light guide according to claim 1,
wherein a width of the at least one second plane of the extraction portion of the light-guide member satisfies a conditional formula below:

$$0.5 \text{ mm} \leq w < 3.0 \text{ mm},$$

where w is the width of the at least one second plane.

4. The light guide according to claim 1,
wherein an angle of inclination of the at least one first plane relative to the exit portion of the light-guide member is equal to an angle of inclination of the at least one third plane reflective to the parallel plane of the optical member.

5. The light guide according to claim 1,
wherein each of the at least one second plane of the extraction portion has a different width.

6. The light guide according to claim 1,
wherein each of the at least one first plane of the extraction portion has a different width.

7. The light guide according to claim 1,
wherein a width of each of the at least one first plane of the extraction portion of the light-guide member increases with distance from the reflective portion to each of the at least one first plane.

8. The light guide according to claim 1,
wherein each of the at least one first plane of the extraction portion of the light-guide member has a coating that reflects the image light.

9. The light guide according to claim 8,
wherein a reflective index of the coating of each of the at least one first plane increases with distance from the reflective portion to each of the at least one first plane.

10. The light guide according to claim 1,
wherein the parallel plane of the optical member has a coating having an increasing transmissivity with distance from the reflective portion.

11. The light guide according to claim 1,
wherein the light-guide member and the optical member are disposed with an air gap between the light-guide member and the optical member.

12. The light guide according to claim 1,
wherein the inclined portion of the optical member is bonded to the extraction portion of the light-guide member.

13. The light guide according to claim 1,
wherein the inclined portion of the optical member is bonded to the extraction portion of the light-guide member by an adhesive having a refractive index ranging from 1.4 through 1.9.

14. A virtual image optical system comprising:
the light guide according to claim 1;
the image display element to output image light of a display image; and
a collimator optical system to emit the image light output from the image display element;
wherein an optical axis of the collimator optical system is inclined relative to the exit portion of the light guide.

15. The virtual image optical system according to claim 14,
wherein the extraction portion of the light-guide member further includes an inclined plane inclined upward from the at least one second plane, between the at least one first plane and the at least one second plane.

16. The virtual image optical system according to claim 14,
wherein each of the incidence portion and the exit portion of the light guide is a planar surface.

17. The virtual image optical system according to claim 14,
- wherein the incidence portion of the light guide projects beyond a plane of the exit portion.

18. The virtual image optical system according to claim 14,
- wherein a F number of the collimator optical system satisfies conditional formula (1) below:

$$1.5 < F\text{ number} < 3.0. \tag{1}$$

19. A virtual image display device comprising:
- a light source to emit light;
- the image display element to receive the light emitted from the light source and output image light of a display image to be displayed as a virtual image;
- a collimator optical system to emit the image light output from the image display element; and
- the light guide according to claim 1 to guide and emit the image light emitted from the collimator optical system.

\* \* \* \* \*